(12) United States Patent
Perez et al.

(10) Patent No.: US 11,180,670 B2
(45) Date of Patent: Nov. 23, 2021

(54) THREE-DIMENSIONAL POROUS SILOXANES USING LEACHABLE POROGEN PARTICLES

(71) Applicant: Lawrence Livermore National Security, LLC, Livermore, CA (US)

(72) Inventors: Lemuel Perez Perez, Livermore, CA (US); Eric B. Duoss, Dublin, CA (US); Jeremy Lenhardt, Tracy, CA (US); Thomas S. Wilson, San Leandro, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 125 days.

(21) Appl. No.: 16/368,725

(22) Filed: Mar. 28, 2019

(65) Prior Publication Data
US 2020/0308428 A1    Oct. 1, 2020

(51) Int. Cl.
| | | |
|---|---|---|
| *C09D 11/16* | (2014.01) | |
| *C08J 9/26* | (2006.01) | |
| *C09D 11/101* | (2014.01) | |
| *C08K 7/22* | (2006.01) | |
| *C08K 5/21* | (2006.01) | |
| *C08L 71/02* | (2006.01) | |
| *C08G 77/20* | (2006.01) | |
| *C08K 9/06* | (2006.01) | |
| *C08K 3/36* | (2006.01) | |
| *C08K 3/013* | (2018.01) | |
| *B29C 64/118* | (2017.01) | |
| *C09D 11/102* | (2014.01) | |
| *B33Y 30/00* | (2015.01) | |
| *B33Y 10/00* | (2015.01) | |
| *B33Y 70/00* | (2020.01) | |

(52) U.S. Cl.
CPC ............ *C09D 11/16* (2013.01); *B29C 64/118* (2017.08); *C08G 77/20* (2013.01); *C08J 9/26* (2013.01); *C08K 3/013* (2018.01); *C08K 3/36* (2013.01); *C08K 5/21* (2013.01); *C08K 7/22* (2013.01); *C08K 9/06* (2013.01); *C08L 71/02* (2013.01); *C09D 11/101* (2013.01); *C09D 11/102* (2013.01); *B33Y 10/00* (2014.12); *B33Y 30/00* (2014.12); *B33Y 70/00* (2014.12); *C08J 2201/042* (2013.01); *C08K 2201/003* (2013.01); *C08K 2201/006* (2013.01)

(58) Field of Classification Search
CPC ..... C09D 11/16; C09D 11/101; C09D 11/102; C09D 11/14; C09D 11/38; C09D 183/04; C08J 9/26; C08J 2201/042; C08J 2201/0422; C08J 2201/026; C08J 9/009; C08J 2383/07; C08J 2471/02; C08J 2201/03; C08J 9/0066; C08K 7/22; C08K 5/21; C08K 9/06; C08K 3/36; C08K 3/013; C08K 2201/003; C08K 2201/006; C08L 71/02; C08G 77/20; C08G 77/12; B29C 64/118; B33Y 30/00; B33Y 10/00; B33Y 70/00

See application file for complete search history.

(56) References Cited

U.S. PATENT DOCUMENTS

| | | |
|---|---|---|
| 8,333,946 B2 | 12/2012 | Gottschalk-Gaudig et al. |
| 2003/0004218 A1 | 1/2003 | Allen et al. |
| 2007/0287771 A1 | 12/2007 | Yamazaki et al. |
| 2010/0239871 A1 | 9/2010 | Scheffer et al. |
| 2014/0356590 A1 | 12/2014 | Hoffee et al. |
| 2016/0198576 A1 | 7/2016 | Lewis et al. |
| 2017/0039898 A1 | 2/2017 | Kim |
| 2017/0225491 A1 | 8/2017 | Miller |
| 2017/0273900 A1 | 9/2017 | Arps et al. |
| 2017/0283655 A1 | 10/2017 | Kenney et al. |
| 2017/0362132 A1 | 12/2017 | Mullens et al. |
| 2018/0066115 A1 | 3/2018 | Achenbach et al. |
| 2019/0100626 A1 | 4/2019 | Durban et al. |

FOREIGN PATENT DOCUMENTS

| | | | |
|---|---|---|---|
| EP | 1433749 A1 | 6/2004 | |
| JP | 2001-139902 | * 5/2001 | |
| WO | 2017081028 A1 | 5/2017 | |
| WO | 2019006029 A1 | 1/2019 | |
| WO | WO-2019006029 A1 * | 1/2019 | ............ C08J 9/0071 |
| WO | 2019067920 A1 | 4/2019 | |

OTHER PUBLICATIONS

Qi et al., Effect of diphenylsiloxane unit content on relaxation behavior of poly(dimethylsiloxane-co-diphenylsiloxane), Journal of Polymer Science: Part B: Polymer Physics, 2008, 46, 1652-1659.*
International Search Report and Written Opinion from PCT Application No. PCT/US2020/024986, dated Jun. 19, 2020.
Rahmanian et al., "Urea Finishing Process: Prilling versus Granulation," Elsevier, Procedia Engineering, vol. 102, 2015, pp. 174-181.
Erturk, A., "Production of Aluminum Glass Fiber Reinforced Foam Synthesized by Space-Holder Technique," Acta Physica Polonica A, vol. 129, No. 4, Apr. 2016, pp. 592-595.
Loeb et al., U.S. Appl. No. 16/374,629, filed Apr. 3, 2019.
Durban et al., U.S. Appl. No. 15/721,528, filed Sep. 29, 2017.

(Continued)

*Primary Examiner* — Irina S Zemel
(74) *Attorney, Agent, or Firm* — Zilka-Kotab, P.C.

(57) ABSTRACT

According to one embodiment, a silicone-based ink for additive manufacturing includes a vinyl-terminated diphenyl siloxane macromer, a treated silica hydrophobic reinforcing filler, a rheology modifying additive, and a plurality of porogen particles. According to another embodiment, a product of additive manufacturing with a silicone-based ink includes a plurality of continuous filaments comprised of a siloxane matrix, where the continuous filaments are arranged in a geometric pattern, a plurality of inter-filament pores defined by the geometric pattern of the continuous filaments, and a plurality of intra-filament pores having an average diameter in a range of greater than 1 micron to less than 50 microns.

12 Claims, 18 Drawing Sheets

(56) References Cited

OTHER PUBLICATIONS

International Search Report and Written Opinion from PCT Application No. PCT/US18/53452, dated Oct. 26, 2018.
SIMTEC, "Reinforcing Fillers in Liquid Silicone Rubber Compounds," SIMTEC, Dec. 11, 2017, 5 pages, retrieved from https://www.simtec-silicone.com/reinforcing-fillers-liquid-silicone-rubber-compounds/.
Duoss et al., "Three-Dimensional Printing of Elastomeric, Cellular Architectures with Negative Stiffness," Advanced Functional Materials, vol. 24, 2014, pp. 4905-4913.
Schmalzer et al., "Gamma radiation effects on siloxane-based additive manufactured structure," Radiation Physics and Chemistry, vol. 130, 2017, pp. 103-111.
AEROSIL, "AEROSIL R 9200," Aerosil, Technical Data Sheet, Jan. 2018, 1 page.
Grassie et al., "The Thermal Degradation of Polysiloxanes—Part 4: Poly(dimethyl/diphenyl siloxane)," Polymer Degradation and Stability, vol. 2, 1980, pp. 67-83.
Teixeira et al., "Microencapsulation of Active Ingredients Using PDMS as Shell Material," Macromolecules, vol. 47, Nov. 21, 2014, pp. 8231-8237.
Vilanova et al., "Preparation of Novel Silicone Multicompartment Particles by Multiple Emulsion Templating and Their Use as Encapsulating Systems," Langmuir, vol. 29, Nov. 21, 2013, p. 15414-15422.
Zoldesi et al., "Deformable Hollow Hybrid Silica/Siloxane Colloids by Emulsion Templating," Langmuir, vol. 22, No. 9, Mar. 30, 2006, pp. 4343-4352.
Zoldesi et al., "Synthesis of Monodisperse Colloidal Spheres, Capsules, and Microballoons," Advanced Materials, vol. 17, No. 7, Apr. 2005, pp. 924-928.
Durban et al., "Custom 3D Printable Silicones with Tunable Stiffness," Macromolecular Rapid Communications accepted manuscript, Jul. 21, 2017, 20 pages, retrieved from https://www.osti.gov/pages/biblio/1417274-custom-printable-silicones-tunable-stiffness.
Bafti et al., "Production of aluminum foam by spherical carbamide space holder technique-processing parameters," Materials and Design, vol. 31, 2010, pp. 4122-4129.
International Preliminary Examination Report from PCT Application No. PCT/US2020/024986, dated Oct. 7, 2021.

* cited by examiner

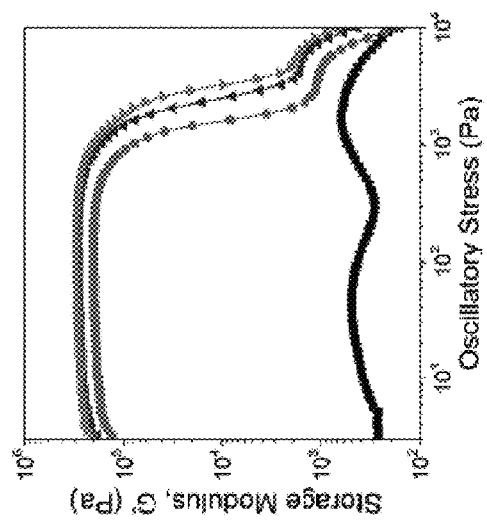
FIG. 3A
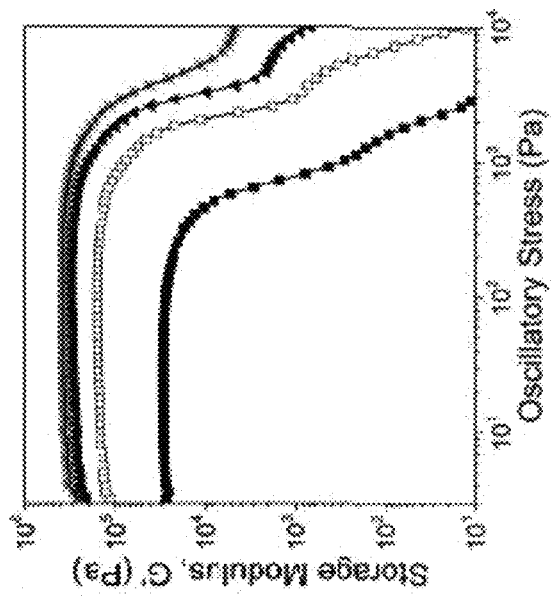
FIG. 3D
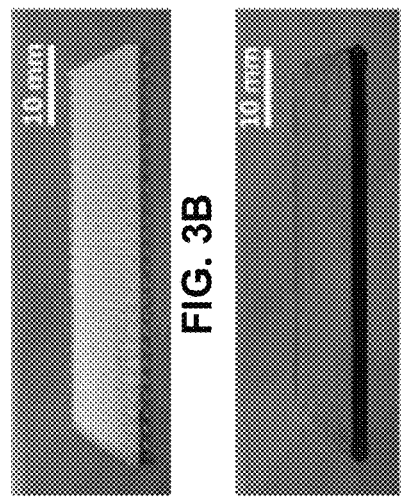
FIG. 3B
FIG. 3C

FIG. 8A
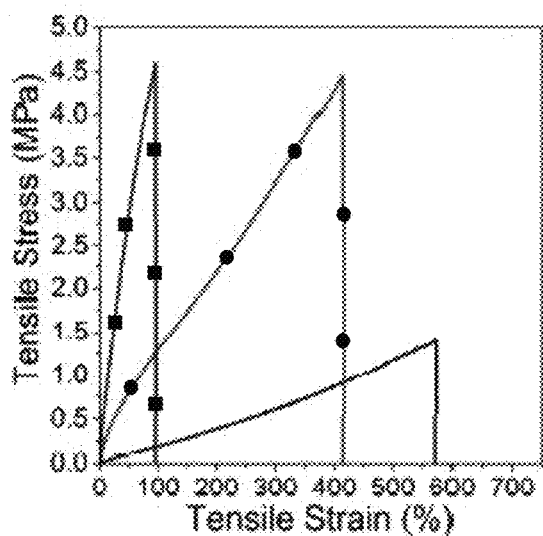
FIG. 8B
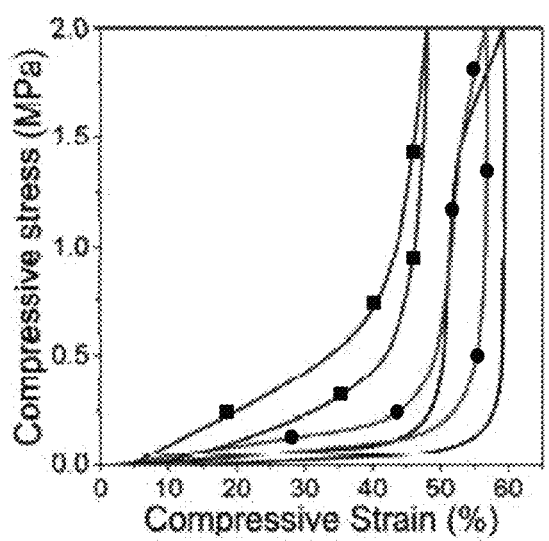
FIG. 8C
FIG. 8D
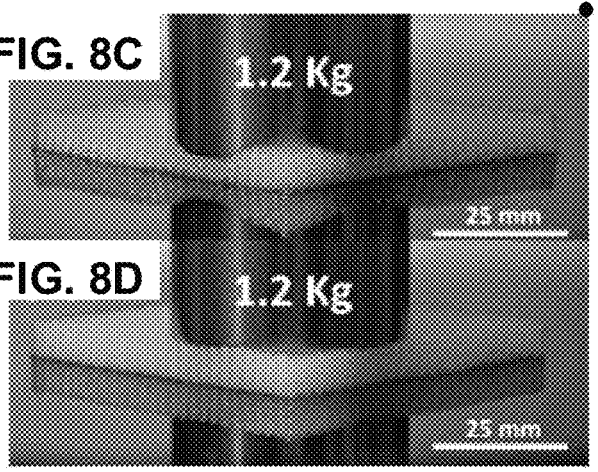
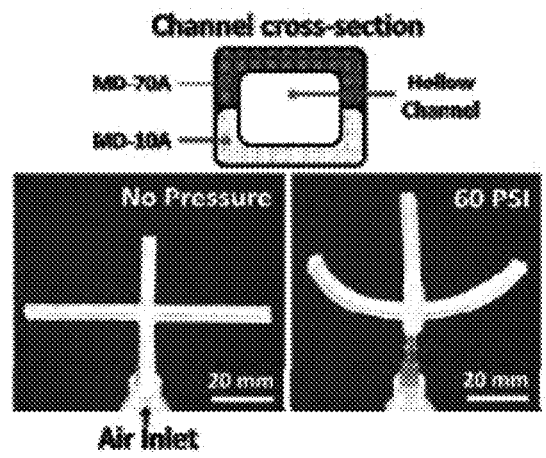
FIG. 8E

THREE-DIMENSIONAL POROUS SILOXANES USING LEACHABLE POROGEN PARTICLES

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to additive manufacturing of silicone materials, and more particularly, this invention relates to silicone-based inks having leachable porogen particles for additive manufacturing and additive manufacturing processes using such inks.

BACKGROUND

The field of three dimensional (3D) printed silicone materials is new and largely unexplored. The flowable nature of liquid silicone materials suggests that silicone material may be used in a direct ink write (DIW) process of additive manufacturing (AM); however, the formation of 3D structures that retain their shape has remained elusive. On the other hand, solid silicone material cannot be used as ink in additive manufacturing because it is unflowable and cannot be extruded from the nozzle during printing. Thus, it would be desirable to create inks for additive manufacturing to form 3D printed parts of silicone material that retain the 3D shape. Moreover, it would be desirable to incorporate porosity within the printed strands of 3D printed structures, and thus, the overall structure (e.g., part) porosity, as compared to outer structural dimensions of non-porous 3D printed material, may be increased.

SUMMARY

In one embodiment, a silicone-based ink for additive manufacturing includes a vinyl-terminated diphenyl siloxane macromer, a treated silica hydrophobic reinforcing filler, a rheology modifying additive, and a plurality of porogen particles.

In another embodiment, a product of additive manufacturing with a silicone-based ink includes a plurality of continuous filaments comprised of a siloxane matrix, wherein the continuous filaments are arranged in a geometric pattern, a plurality of inter-filament pores defined by the geometric pattern of the continuous filaments, and a plurality of intra-filament pores having an average diameter in a range of greater than 1 micron to less than 50 microns.

In yet another embodiment, a method of forming a three-dimensional printed siloxane structure having intra-filament porosity includes extruding a continuous filament of a mixture through a nozzle to form a structure having continuous filaments, curing the extruded mixture to at least a predefined extent to form the three-dimensional printed siloxane structure, and leaching the porogen particles from the three dimensional printed siloxane structure. The mixture includes a vinyl-terminated siloxane macromer, a treated silica hydrophobic reinforcing filler, a rheology modifying additive, and a plurality of porogen particles.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 3A is a plot of oscillatory stress of storage modulus values for silicone-based inks, according to various embodiments.

FIG. 3B is a lattice 8-layer structure formed by a silicone-based ink with rheological additive, according to one embodiment.

FIG. 3C is a lattice 8-layer structure formed by a silicone-based ink without rheological additive, according to one embodiment.

FIG. 3D is a plot of the effect of treated reinforcing silica filler on observed yield stress, according to various embodiments.

FIG. 8A is a plot of tensile stress versus tensile strain, according to various embodiments.

FIG. 8B is a plot of compressive performance, according to various embodiments.

FIGS. 8C and 8D are images of a physical demonstration of stiffness of 3D printed silicone-based lattices, according to various embodiments.

FIG. 8E is a diagram of a 3D-printed air-driven soft robotic actuator, according to one embodiment.

Figures 9A, 9B:
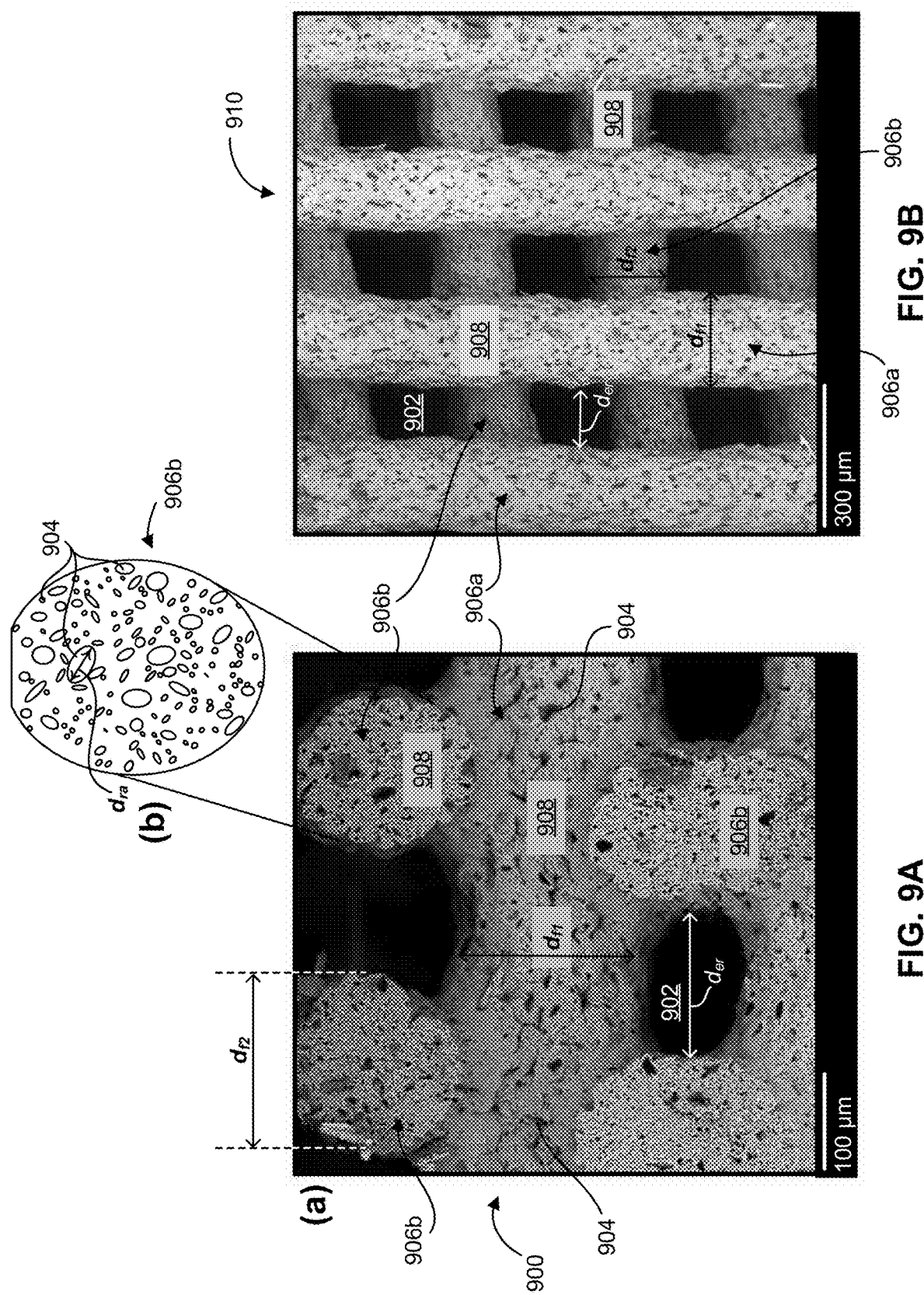

Part (a) of FIG. 9A is a scanning electron microscopy image of a cross-section of a three-dimensional printed porous siloxane structure, according to one embodiment.

Part (b) of FIG. 9A is a drawing of a cross-section of a filament shown in part (a).

FIG. 9B is a scanning electron microscopy image of a top view of a three-dimensional printed porous siloxane structure, according to one embodiment.

Figure 10:
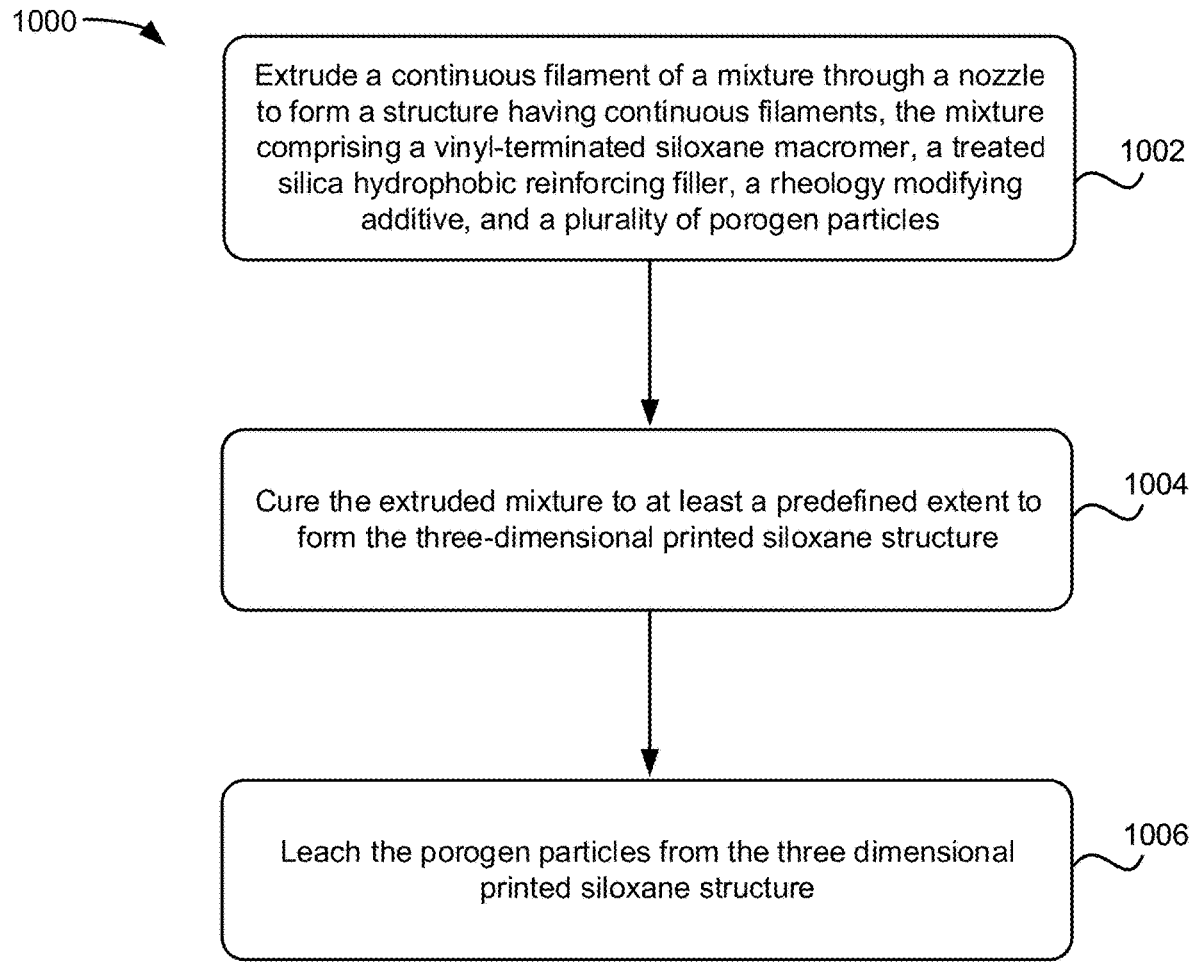

FIG. 10 is a flow chart of a method, according to one embodiment.

Figure 11:
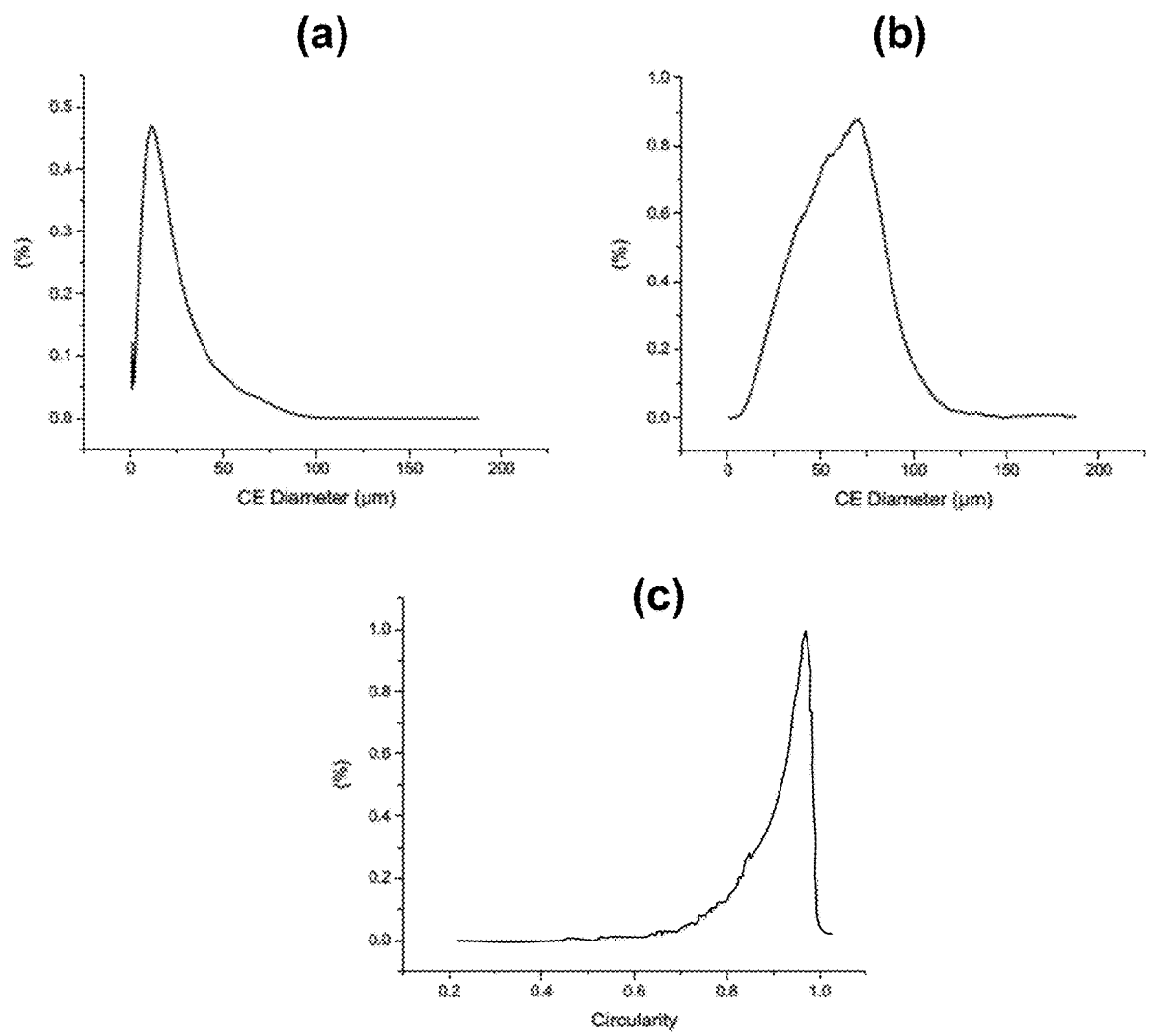

FIG. 11 are plots of various characteristics to sieved urea particles, according to various approaches. Part (a) depicts a plot of the number distribution of sieved urea particles according to mean CE diameter. Part (b) depicts a plot of volume distribution (D[4,3]) according to mean CE diameter. Part (c) depicts the circularity of the population of sieved urea particles.

Figure 12:
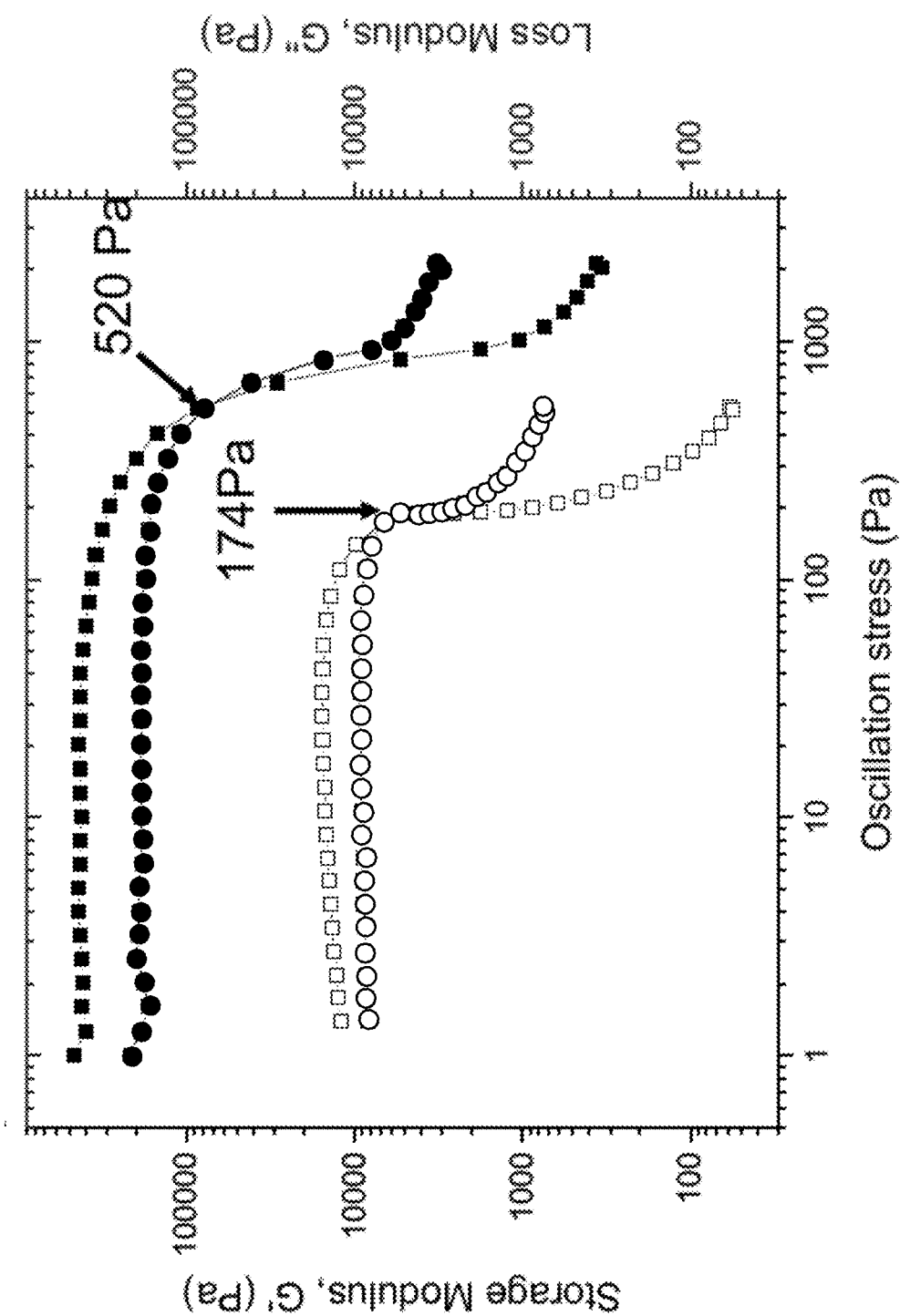

FIG. 12 is a plot of storage modulus and loss modulus of various siloxane resins, according to one embodiment.

Figure 13B:
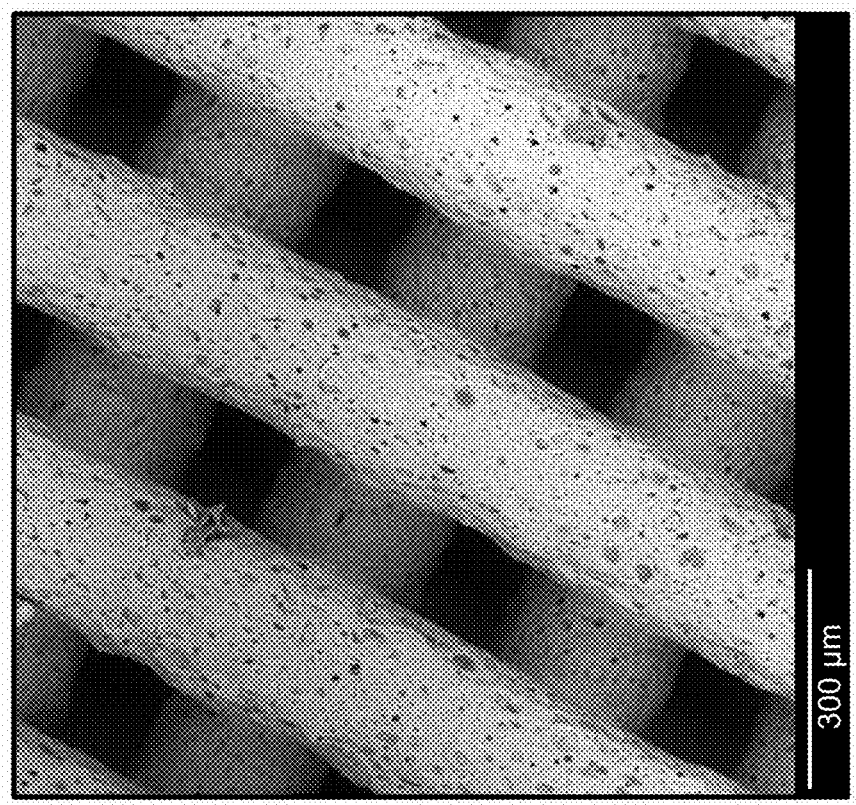
Figure 13A:
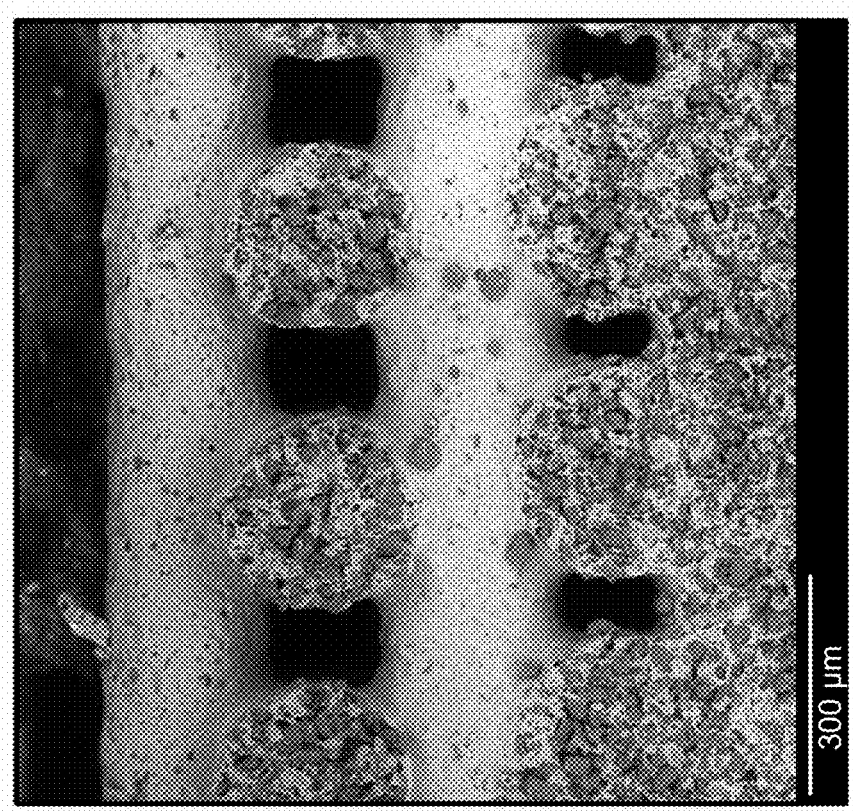

FIG. 13A is scanning electron microscopy image of a cross-section of a three-dimensional printed part using siloxane resin with urea particles, according to one embodiment.

FIG. 13B is a scanning electron microscopy image of a top view of a three-dimensional printed part using siloxane resin with urea particles, according to one embodiment.

Figure 14:
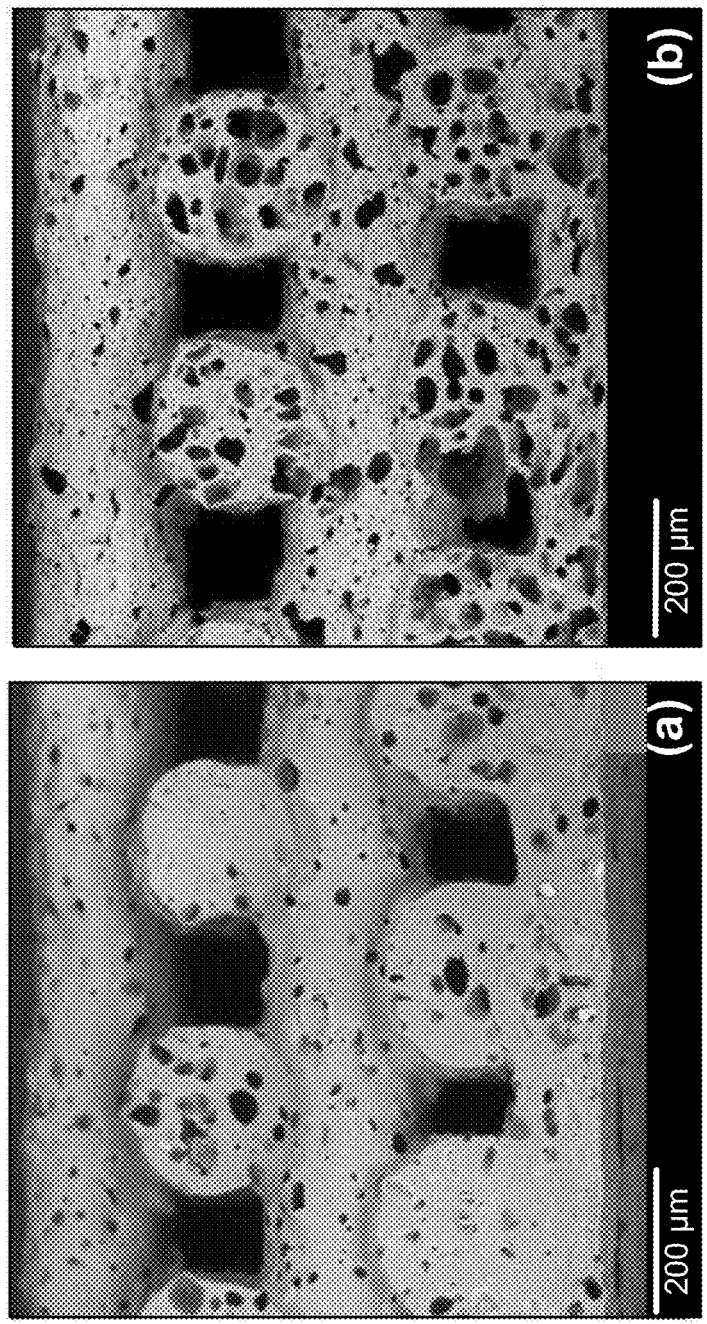

Part (a) of FIG. 14 is a scanning electron microscopy image of a porous 3D siloxane structure printed with siloxane ink having 25 volume % porogen particles, according to one embodiment.

Part (b) of FIG. 14 is a scanning electron microscopy image of a porous 3D siloxane structure printed with siloxane ink having 70 volume % porogen particles, according to one embodiment.

Figure 15:
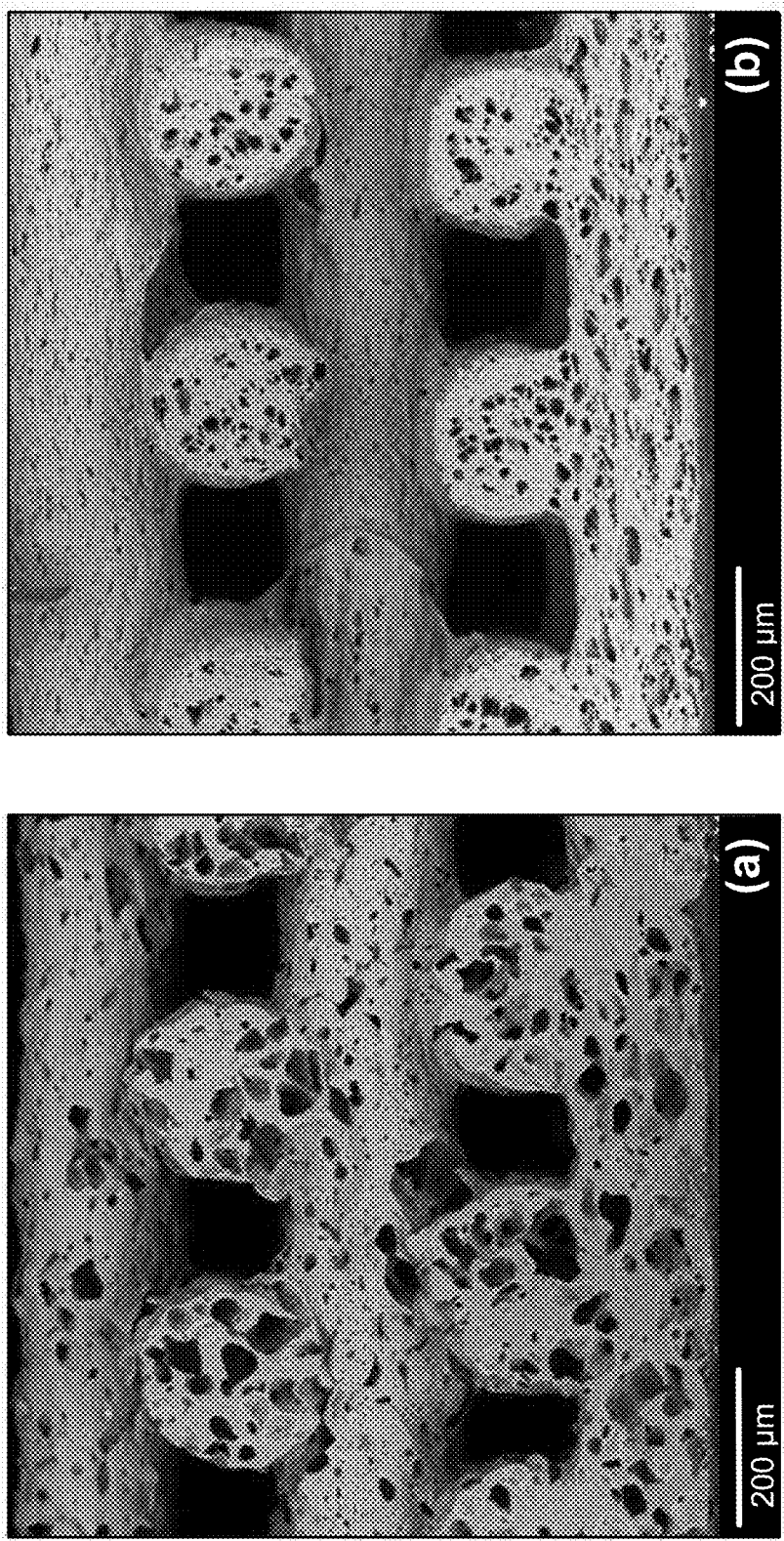

Part (a) of FIG. 15 is a scanning electron microscopy image of a porous 3D siloxane structure printed with siloxane ink having spherical porogen particles, according to one embodiment.

Part (b) of FIG. 15 is a scanning electron microscopy image of a porous 3D siloxane structure printed with siloxane ink having small, elongated porogen particles, according to one embodiment.

Figure 16:
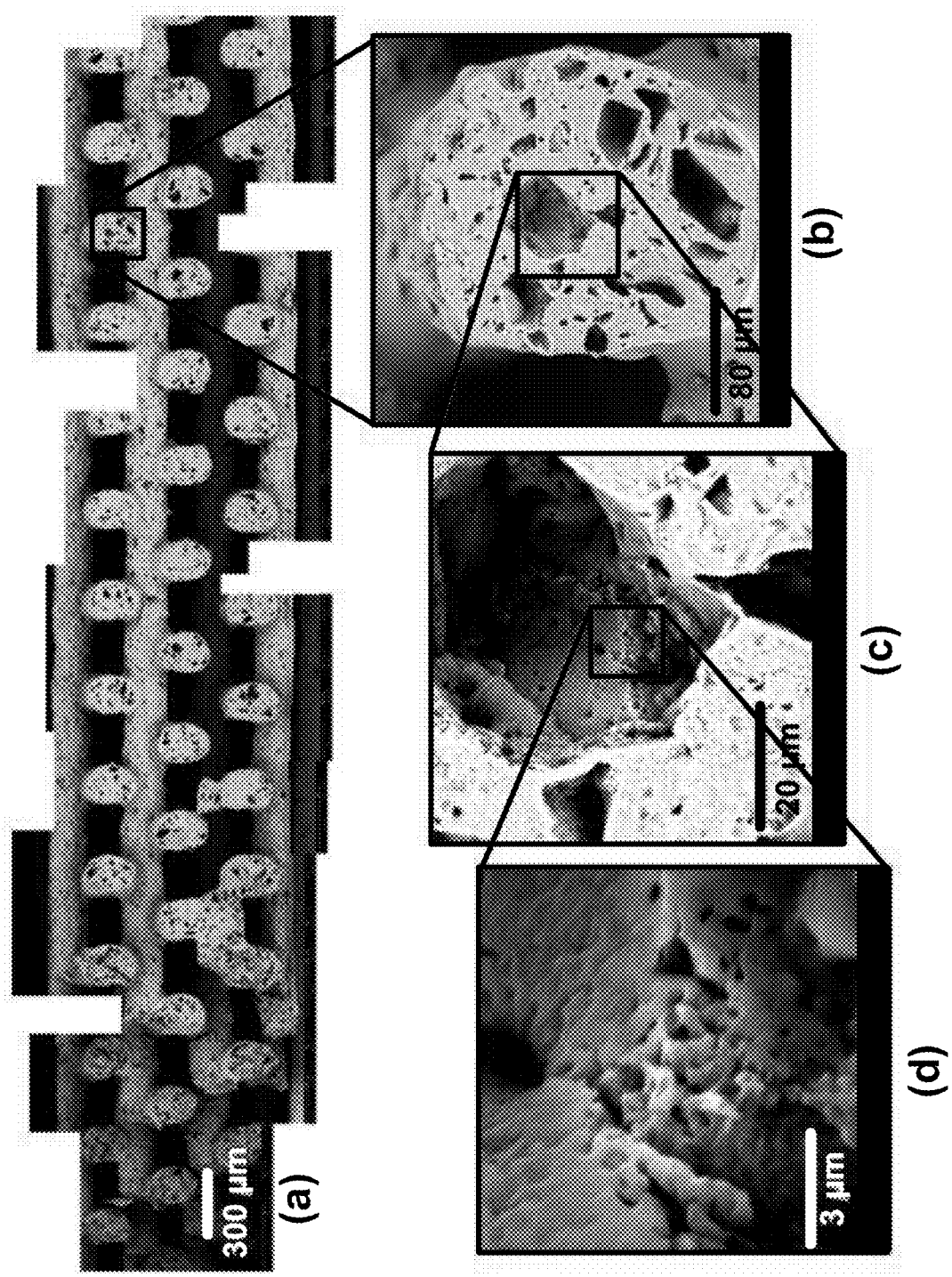

FIG. 16 is a series of scanning electron microscopy images of a porous 3D siloxane structure printed with siloxane ink having sugar particles as porogen particles, according to one embodiment. Part (a) is an image of the 3D printed structure. Part (b) is a magnified view of a filament in the image of part (a). Part (c) is an image of a magnified view of a pore of the filament in the image of part (b). Part (d) is a magnified view of inside the pore in the image of part (c).

Figure 17:
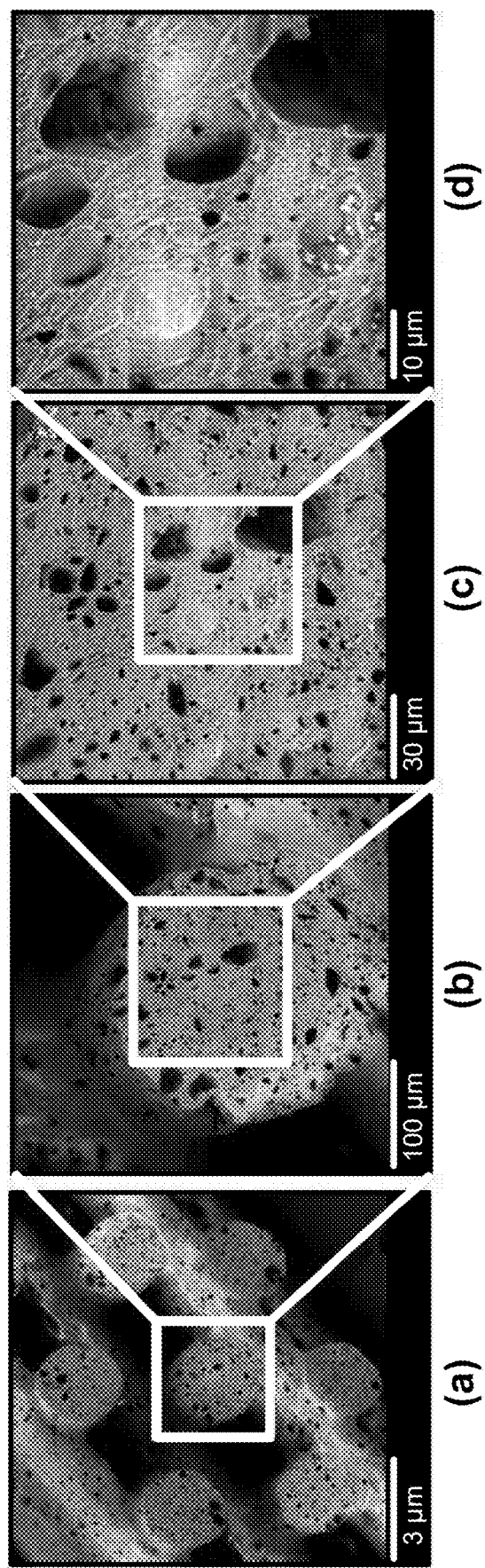

FIG. 17 is a series of scanning electron microscopy images of a porous 3D siloxane structure printed with siloxane ink having polyethylene glycol (PEG) as porogen particles, according to one embodiment. Part (a) is an image of the 3D printed structure. Part (b) is a magnified view of a filament in the image of part (a). Part (c) is an image of a magnified view of a portion of the filament in the image of part (b). Part (d) is a magnified view of portion of the image of part (c).

Figure 18:
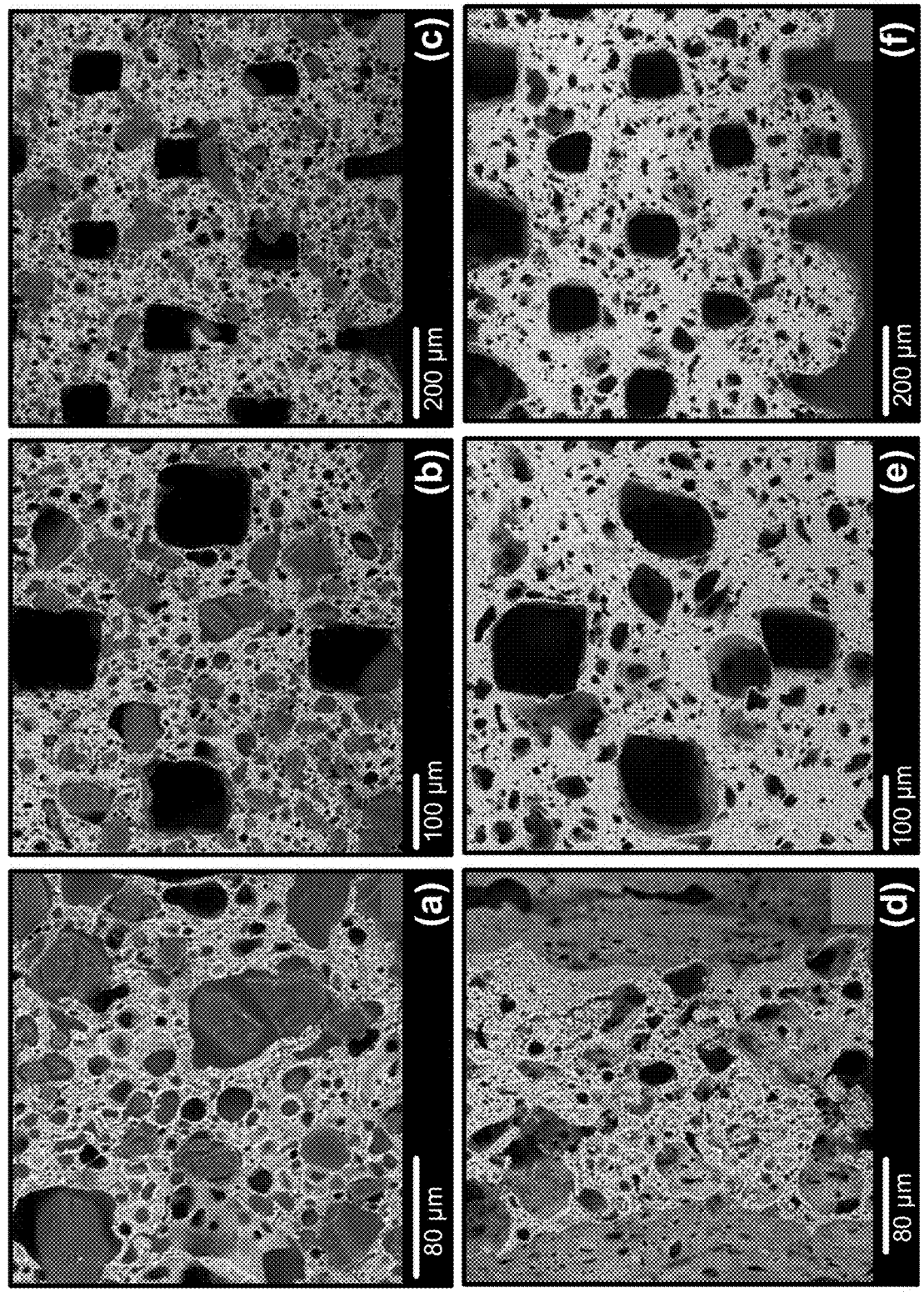

FIG. 18 is a series of scanning electron images of siloxane 3D printed structures formed by DIW with a siloxane ink having a mixture of urea particles and glycerol used as porogen particles, according to one embodiment. Parts (a), (b), and (c) are images of the printed structure before removing the porogen particles. Parts (d), (e), and (f), are images of the printed structure after removing the porogen.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that, ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

It is also noted that, as used in the specification and the appended claims, wt % is defined as the percentage of weight of a particular component is to the total weight/mass of the mixture. Vol % is defined as the percentage of volume of a particular compound to the total volume of the mixture or compound. Mol % is defined as the percentage of moles of a particular component to the total moles of the mixture or compound. Atomic % (at %) is defined as a percentage of one type of atom relative to the total number of atoms of a compound.

The present disclosure includes several descriptions of exemplary "inks" used in an additive manufacturing process to form the inventive optics described herein. It should be understood that "inks" (and singular forms thereof) may be used interchangeably and refer to a composition of matter comprising a plurality of particles coated with/dispersed throughout a liquid phase such that the composition of matter may be "written," extruded, printed, or otherwise deposited to form a layer that substantially retains its as-deposited geometry and shape without excessive sagging, slumping, or other deformation, even when deposited onto other layers of ink, and/or when other layers of ink are deposited onto the layer. As such, skilled artisans will understand the presently described inks to exhibit appropriate rheological properties to allow the formation of monolithic structures via deposition of multiple layers of the ink (or in some cases multiple inks with different compositions) in sequence.

The following description discloses several preferred structures formed via direct ink writing (DIW), extrusion freeform fabrication, or other equivalent techniques and therefore exhibit unique structural and compositional characteristics conveyed via the precise control allowed by such techniques.

The following description discloses several preferred embodiments of silicone-based formulations for forming three-dimensional parts with intra-filament porosity and/or related systems and methods.

In one general embodiment, a silicone-based ink for additive manufacturing includes a vinyl-terminated diphenyl siloxane macromer, a treated silica hydrophobic reinforcing filler, a rheology modifying additive, and a plurality of porogen particles.

In another general embodiment, a product of additive manufacturing with a silicone-based ink includes a plurality of continuous filaments comprised of a siloxane matrix, wherein the continuous filaments are arranged in a geometric pattern, a plurality of inter-filament pores, wherein the inter-filament pores are defined by the geometric pattern of the continuous filaments, and a plurality of intra-filament pores, wherein the intra-filament pores have an average diameter in a range of greater than 1 micron to less than 50 microns.

In yet another general embodiment, a method of forming a three-dimensional printed siloxane structure having intra-filament porosity includes extruding a continuous filament of a mixture through a nozzle to form a structure having continuous filaments, curing the extruded mixture to at least a predefined extent to form the three-dimensional printed siloxane structure, and leaching the porogen particles from the three dimensional printed siloxane structure. The mixture includes a vinyl-terminated siloxane macromer, a treated silica hydrophobic reinforcing filler, a rheology modifying additive, and a plurality of porogen particles.

A list of acronyms used in the description is provided below.

| | |
|---|---|
| 3D | Three dimensional |
| AM | Additive manufacturing |
| C | Celsius |
| cSt | centiStokes |
| DIW | Direct Ink Writing |
| DPS | diphenylsiloxane |
| ETCH | 1-ethynyl-1-cyclohexanol |
| FCT | face centered tetragonal |
| g | gram |
| HMDZ | hexamethyldisilazane |
| Pa | Pascals |
| PDMS | polydimethylsiloxane |
| PHMS | poly(hydrogenmethylsiloxane) |
| ppm | parts per million |
| Pt | Platinum |
| SEM | Scanning electron microscopy |
| W | Watt |
| Wt. % | weight percent |

Inks with a specific rheology used in 3D printing allow the resulting 3D printed structures to retain their shape for an extended period of time before curing.

According to various embodiments, silicone-based inks with appropriate rheological behavior for 3D printing result in printing 3D porous structures with controlled architectures. Various embodiments described herein demonstrate the capability to tune the stiffness of printable silicone materials by controlling the chemistry, network formation, and crosslink density of silicone-based ink formulations in order to overcome the challenging interplay between ink development, post-processing, material properties, and performance. Various embodiments described herein identify materials and methods by which to prepare custom-tailored 3D printable silicone materials through DIW processes.

Moreover, various embodiments described herein demonstrate that through adjustments to the chain lengths of functional silicone-based materials and through the incorporation of reinforcing filler materials, silicones can be prepared with tunable stiffness, unlocking the ability to print functional parts exhibiting anisotropic behavior and properties when printed in tandem or dynamically mixed. Furthermore, custom formulations prepared according to the teaching herein unlock the ability to control the chemistry of silicone-based materials, affecting their aging behavior, material compatibility and biocompatibility, and surface chemistry to impart adhesiveness. Described herein are a series of low temperature stable 3D printable silicones with tunable stiffness developed through a study of silicone rheology, pseudoplasticity, filler loading, and cure inhibition, to facilitate the printing of silicone materials with an extended working lifetime.

Silicone elastomers have broad versatility within a variety of advanced material applications, such as soft robotics, biomedical devices, and metamaterials. However, non-polar silicone materials are not naturally pseudoplastic or thixotropic in which a solid silicone material becomes liquid with applied stress. In would be desirable to develop an ink using non-polar silicone materials so that silicone-based 3D structure may be formed.

In one embodiment, a silicone-based ink for additive manufacturing includes a vinyl-terminated siloxane macromer, a hydrophobic reinforcing filler, and a rheology modifying additive. In some approaches, the vinyl-terminated siloxane macromer may be an oligomeric organosiloxane macromer. In other approaches, the vinyl-terminated siloxane macromer may be a polymeric organosiloxane macromer. In an exemplary approach, the vinyl-terminated siloxane macromer may be a vinyl-terminated polydimethylsiloxane (PDMS) macromer. In some approaches, the vinyl-terminated siloxane macromer may have a viscosity in a range of about 500 centiStoke and about 50,000 centiStoke (cSt).

In one embodiment, a silicone-based ink for additive manufacturing includes a vinyl-terminated polydimethylsiloxane-diphenyl siloxane (DPS) macromer, hydrophobic reinforcing filler, and a rheology modifying additive. In some approaches, a vinyl-terminated PDMS-DPS macromer may have a viscosity in a range of about 500 cSt to about 50,000 cSt.

In some embodiments of the silicone-based ink, the hydrophobic reinforcing filler may be treated silica. In some approaches, the treated silica may have a surface area in a range of about 50 $m^2/g$ to about 250 $m^2/g$. In a preferred approach, the treated silica may have a surface area in a range of about 100 $m^2/g$ to 200 $m^2/g$ for imparting reinforcement while alleviating an increase in viscosity that could obstruct the extrusion process. In some approaches, the treated silica may be hexamethyldisilazane (HMDZ)-treated silica. In other approaches, additional treated silicas with increased hydrophobicity may also be used. In some approaches, a silicone-based ink may include a composite of PDMS-DPS and hydrophobic filler such as HMDZ-treated silica. The hydrophobic reinforcing filler, such as HMDZ-treated silica, may be included to ensure a long-term stability of 3D printed silicone components prior to curing. HMDZ treatment of silica may involve capping the silanol groups of the silica with HMDZ to yield trimethylsilanes and a hydrophobic filler surface.

In some embodiments, fumed silica in the silicone-based ink may be in a range of about 5 wt. % to about 50 wt. % of total composition of the ink, and preferably in a range of about 12 wt % to about 35 wt. % of total composition of the ink. In some approaches, silica fillers with reduced surface area allow an increase degree of silica loading without over-saturating the liquid ink matrix, and thereby resulting in highly stiff printable silicone materials. In some approaches, the effective concentration of fumed silica may be determined from the surface area of the fumed silica using known techniques.

In other approaches, an untreated silanol-containing filler may likely result in crepe hardening (i.e. thickening of uncured silicones) of the silicone under prolonged storage before curing. Moreover, premature hardening of the silicone may yield a progressive increase in material stiffness due in part to condensation reactions between neighboring silanol groups. Furthermore, the use of untreated silica fillers may reduce the mechanical strength and alter the physical properties of silicones. In some cases, untreated silica fillers may retain more moisture than hydrophobic fillers, and thus may be undesirable for long term applications.

In various embodiments, silicone-based inks may be prepared with a proper rheology for 3D printing in which structures with pre-defined dimensions are formed.

In some embodiments, a rheology modifying additive may be added to impart silicone pseudoplasticity. Rheology modifying additives impart thixotropy in silicone materials. A rheology modifying additive may be a thixotropic additive that imparts pseudoplasticity in silicone elastomers. In some approaches, the rheology modifying additive may be a silicone polyether, a methylvinyl siloxane (or dimethyl siloxane), dimethoxy (glycidoxypropyl)-terminated, glycerol, 2-propanol or combinations thereof. In some embodiments, the silicone-based ink may include a rheology modifying additive in a range of about 0.01 wt. % to about 10.0 wt % of total composition, and preferably about 0.2 wt. % to about 1.0 wt. % of total composition.

Without wishing to be bound by any theory, it is believed that the mechanism of pseudoplasticity of a silicone-based ink, according to some embodiments, involves the formation of a stable 3D network between treated-silica filler particles and a rheological modifying additive via hydrogen bonding and potential van der Waals interactions.

In other approaches, a more hydrophilic reinforcing filler such as untreated fumed silica may be incorporated into the silicone-based material to impart thixotropy of the silicone material into solid-like network in the absence of applied stress. The mechanism of pseudoplasticity may be attributed to unreacted silanol groups on the silica surface, thereby allowing for particle associations through hydrogen bonding to form an anti-sagging network exhibiting shape retention behavior.

Embodiments described herein encompass a low-temperature stable silicone-based material with the ideal rheology for 3D printing, which may be custom formulated to yield a wide range of physical properties applicable to a variety of fields and industries. For example, the reinforcing filler may be refractive index-matched to impart a 3D silicone structure with transparent optical-grade properties. According to various embodiments described herein, a wide-range of silicone-based 3D structures of varying hardness and stiffness levels may be prepared from silicone-based materials.

In some embodiments, silicone-based inks may be pseudoplastic, non-Newtonian fluids, capable of being deposited in a layer-by-layer pattern during 3D printing.

In some embodiments, the silicone-based ink may include a curing agent. In some approaches, the curing agent may utilize hydrosilylation chemistry during the curing of the 3D structure, such as a platinum curing agent (e.g., Karstedt Pt catalyst), ruthenium curing agent, iridium curing agent, and/or rhodium curing agent. In some approaches, platinum-catalyzed hydrosilylation chemistry (e.g. platinum catalyzed addition of silanes to alkenes) may be used to cure the structured formed with silicone-based inks. In other approaches, ruthenium-catalyzed hydrosilylation chemistry may be used to cure the structures formed with silicone-based inks. In yet other approaches, iridium-catalyzed hydrosilylation chemistry may be used to cure the structures formed with silicone-based inks. In yet other approaches, rhodium-catalyzed hydrosilylation chemistry may be used to cure the structures formed with silicone-based inks.

In some approaches, it is advantageous to use platinum (Pt)-group metal-catalyzed hydrosilylation chemistry because the process does not generate volatile reaction products as compared to condensation cure reactions that produce byproducts such as acetic acid and ethanol. Moreover, these byproducts could deleteriously contribute to some material shrinkage and deviation from the form of the printed 3D structure as deposited.

In some embodiments, the silicone-based ink may include a Pt-group metal curing agent involved in metal catalyzed hydrosilylation chemistry, at a concentration in the range of about 1 to about 1000 ppm, and preferably in a range of about 1 to about 100 ppm, and ideally, 1 to about 50 ppm. In some approaches, the silicone-based ink may include an effective amount of Pt-group metal to initiate a metal-catalyzed hydrosilylation chemistry curing reaction at pre-defined curing conditions, e.g. a pre-defined elevated temperature.

In some embodiments, the silicone-based ink may include an effective amount of an inhibitor for controlling a rate of curing by the curing agent under ambient atmospheric conditions. In some approaches, the inhibitor may be selected based on the curing agent. In some approaches, to maximize the printing time before cure (for example, delay the curing reaction as long as possible), an appropriate choice of a reaction inhibitor relative to the curing agent may be added to inhibit platinum-catalyzed curing chemistry, thereby providing a prolonged pot life duration for extended 3D printing sessions.

In some approaches, in the absence of the reaction inhibitor, the curing mechanism involving the polymerization reaction may proceed rapidly thereby solidifying the printed part within minutes. Thus, a metal-catalyst curing agent (for example Karstedt Pt catalyst), without reaction inhibitor may be undesirable for silicone-based inks involved in the printing of large parts.

In some approaches, the curing agent may induce curing in response to ultraviolet radiation. In other approaches, a curing agent may induce curing in response to free radical chemistry. In yet other approaches, the curing agent may induce curing in response to ionizing radiation. Known curing agents may be used in such approaches.

In some embodiments, the silicone-based ink may include a cross-linking agent as used in cure chemistry. For example, one hydrosilylation cure of siloxanes involves a poly(methylhydrosiloxane) containing additive in which the number of methylhydrosiloxane units along the polymeric or oligomeric chain may be greater than 3 per molecule. In various embodiments, through the implementation of dihydride chain extension chemistry, a silicone-based ink may be formed with very low hardness and stiffness that may be applicable to soft robotics and flexible electronics. In some approaches, a cross linking agent may be hydride terminated chain extension additives, for example, a hydride terminated PDMS-poly(hydrogenmethylsiloxane)(PHMS) copolymer. In other approaches, a short chain vinyl terminated PDMS additive may also be included to impart greater hardness to the cured material.

In some embodiments, the silicone-based inks described herein may be stable at low temperatures. Conventional PDMS-based materials exhibit relatively poor temperature stability beyond −45° C. due to PDMS crystallization. In some approaches, the replacement of PDMS with a random copolymer of PDMS and about 2-6 mole % diphenylsiloxane (DPS) may impart low temperature stability of silicone-based ink. For example, incorporation of the diphenyl moieties of DPS may inhibit crystallization of the PDMS chains at reduced temperature. In other approaches, short chain vinyl-terminated PDMS may be used with additional silica filler to decrease the average molecular weight between crosslinking sites thereby resulting in high hardness and stiffness of the 3D printed structure from the silicone-based ink.

In some embodiments, the silicone-based inks may be formulated to yield two-part materials in predetermined ratios. For example, Part A may include vinyl-terminated poly(dimethylsiloxane)-co-(diphenylsiloxane) macromer, a hydrophobic reinforcing filler, a rheology modifying additive, and a curing agent; and Part B may include a curing agent inhibitor, a crosslinker and an additional vinyl-terminated polydimethylsiloxane-co-diphenysiloxane macromer to create a 10:1 2-part A:B system. In some approaches, Part A may be assembled and then may be stored until use. Part B may be assembled and then stored until use. In other approaches, Part A and Part B may be assembled separately and used immediately.

Figure 1:
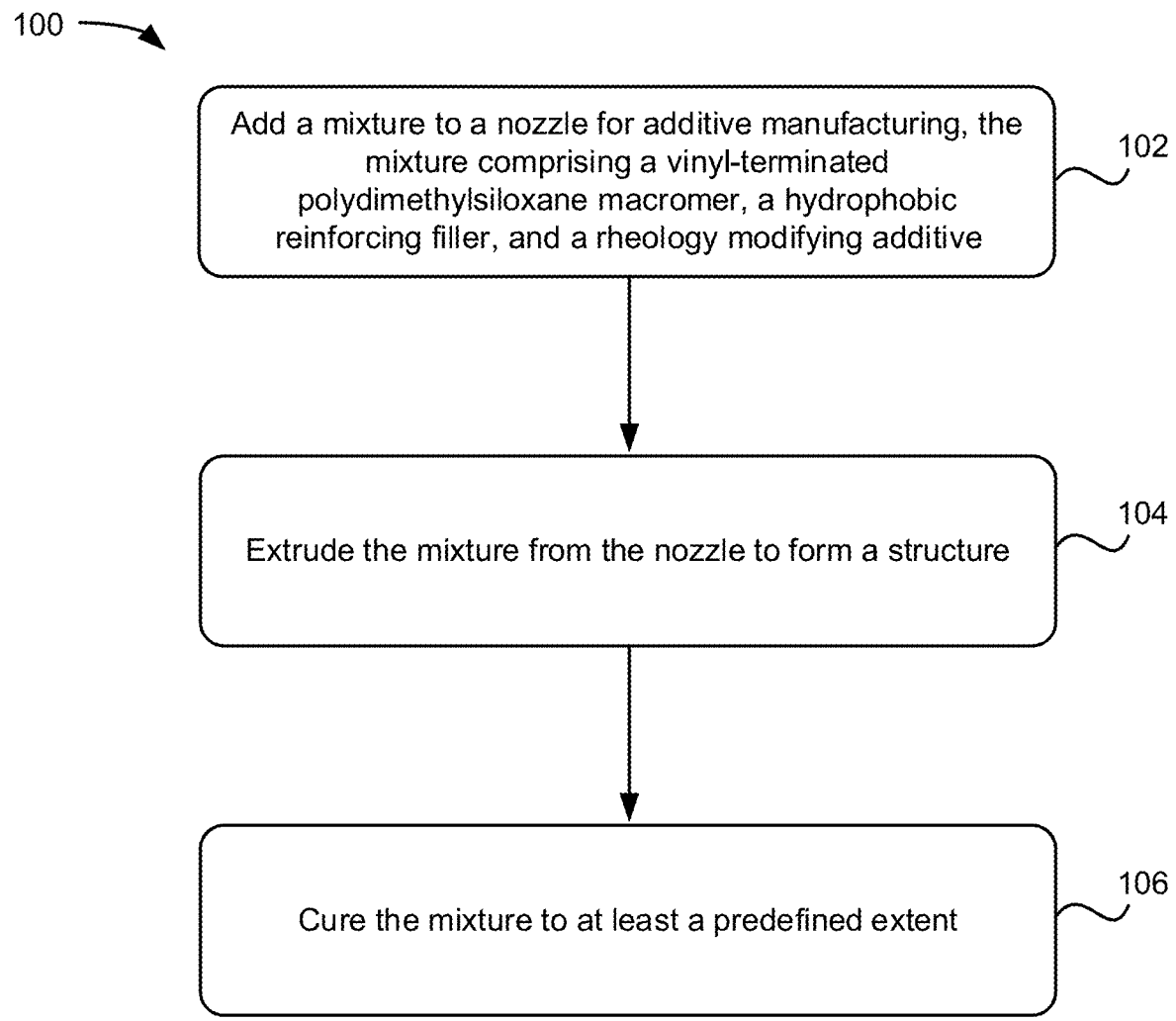
FIG. 1 is a flow chart of a method, according to one embodiment.

FIG. 1 shows a method 100 for additive manufacturing with silicone-based ink, in accordance with one embodiment. As an option, the present method 100 may be implemented to construct structures such as those shown in the other FIGS. described herein. Of course, however, this method 100 and others presented herein may be used to form structures for a wide variety of devices and/or purposes which may or may not be related to the illustrative embodiments listed herein. Further, the methods presented herein may be carried out in any desired environment. Moreover, greater or fewer operations than those shown in FIG. 1 may be included in method 100, according to various embodiments. It should also be noted that any of the aforementioned features may be used in any of the embodiments described in accordance with the various methods.

According to one embodiment, the method 100 begins with step 102 involving adding a mixture to a cartridge for additive manufacturing, the mixture comprising a vinyl-terminated polydimethylsiloxane macromer, a hydrophobic reinforcing filler, and a rheology modifying additive. In this and other embodiments, the cartridge may be a nozzle. The mixture may be formed in the nozzle, where one or more of the components is added to the nozzle separately from the other components. A mixer may provide mixing within the nozzle. In another approach, the mixture may be premade and fed to the nozzle.

In some approaches, step 102 may include adding to the mixture, in the cartridge, a curing agent and/or a crosslinking agent. Alternatively, the curing agent and/or crosslinking agent may be part of a premade mixture that is fed through the cartridge.

In yet other approaches, step 102 may include adding to the mixture, in the cartridge, an effective amount of an inhibitor for controlling a rate of curing by the curing agent. Alternatively, the inhibitor may be part of a premade mixture that is fed through the cartridge.

Step 104 of method 100 involves extruding the mixture through the cartridge to form a structure. In various approaches, the presence of a rheology modifying additive imparts pseudoplasticity to the silicone-based ink such that the compression stress of the ink in the cartridge allows the ink to be extruded from the cartridge during 3D printing.

Step 106 of method 100 involves curing the mixture to at least a predefined extent. In various approaches, the 3D printed structure of silicone-based ink may be cured according to the curing agent present in the silicone-based ink. In some approaches, the temperature may be raised in order to initiate curing. In other approaches, UV irradiation may be used to initiate curing of the printed structure. In yet other approaches, free radical chemistry may be used to initiate curing of the printed structure. In various other approaches, curing may be initiated by methods known by one skilled in the art.

In some approaches of method 100, the formed structure may be a three-dimensional structure. In some approaches of method 100, the applied manufacturing is direct ink writing.

In one embodiment, a product of additive manufacturing with a silicone-based ink includes a vinyl-terminated siloxane macromer, a hydrophobic reinforcing filler, a rheology modifying additive, a curing agent, an inhibitor of the curing agent, and a crosslinking agent. In some approaches, the product may be a silicone-based three-dimensional (3D) structure.

In some embodiments, the product of additive manufacturing with silicone-based ink may have features about 100 µm or larger. Based on the ink viscosity smaller features may be created below 100 µm. In some embodiments, the product may have dimensional stability. In other words, the structure formed following 3D printing with silicone-based inks may retain pre-defined dimensions following curing of the structure, for example, there is minimal shrinkage.

In some embodiments, 3D printable silicone-based materials may be prepared with hardness values as low as Shore 10A (see Table 1 Experiments Section below), indicating penetration by the indenter of the durometer. A Shore durometer may be used to provide a measure of hardness in polymer, elastomer, and rubber material in terms of the material's resistance to indentation. The inclusion of dihydride chain extenders may serve to increase the molecular weight of the silicone polymer between crosslinking sites, yielding a material with reduced hardness and stiffness.

Figure 2:
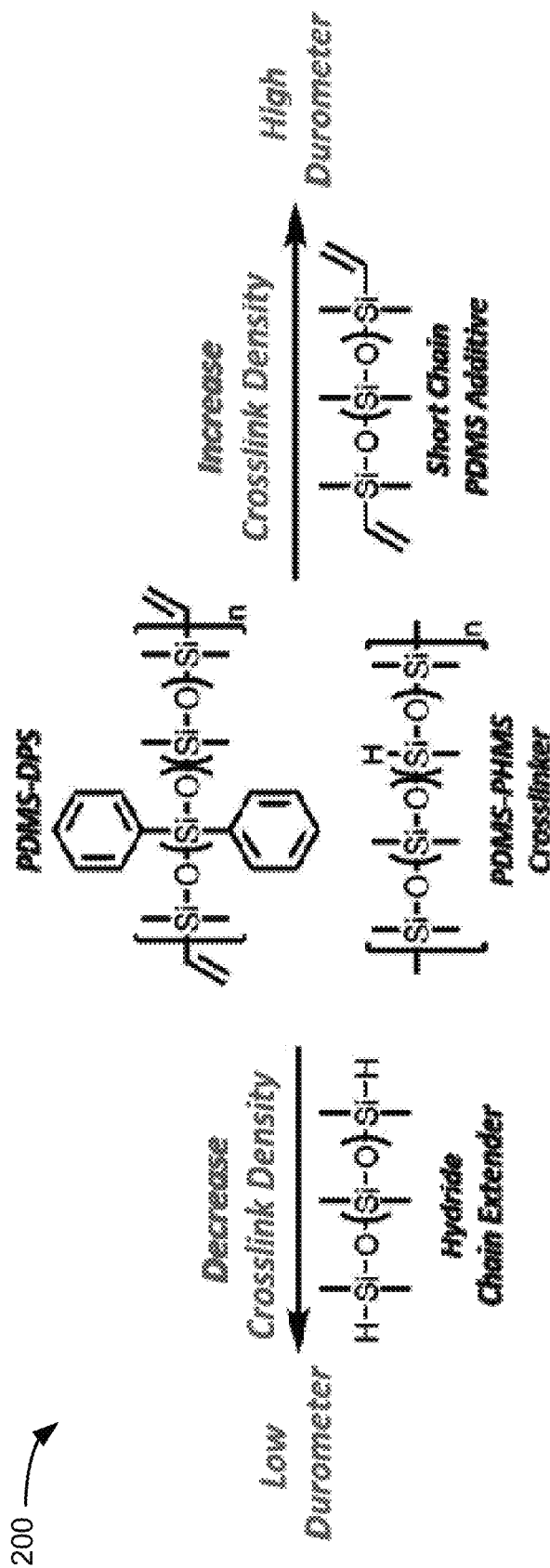
FIG. 2 is a schematic drawing of durometer silicone elastomers, according to various embodiments.

FIG. 2 depicts a structure 200 of variable durometer silicone elastomers, in accordance with one embodiment. As an option, the present structure 200 may be implemented in conjunction with features from any other embodiment listed herein, such as those described with reference to the other FIGS. Of course, however, such structure 200 and others presented herein may be used in various applications and/or in permutations which may or may not be specifically described in the illustrative embodiments listed herein. Further, the structure 200 presented herein may be used in any desired environment.

FIG. 2 is a simplified diagram that describes the formulation of variable durometer silicone elastomers. The core formulation components involved in custom stiffness tuning include a vinyl terminated PDMS-DPS polymer in conjunction with a hydride terminated PDMS-PHMS copolymer crosslinker, other components include silica fillers, rheological additives, inhibitors, and curing agents (for example, Pt catalysts). In some approaches, a reduction in the effective crosslink density and less stiffness (shifting to the left, Low Durometer) may be achieved through the use of hydride terminated chain extension additives. In other approaches, an increase in the effective crosslink density and greater stiffness (shifting to the right, High Durometer) may be achieved through the use of low molecular weight or short chain vinyl terminated PDMS additives, or those additives such as vinyl containing siloxane resins, such as siloxane resins built from M and Q units (MQ resins).

In one embodiment, the stiffness and rheological properties of a siloxane formulation may be tuned to complement the addition of a soluble particle as a pore-former additive. In some approaches, a 3D part is printed with a siloxane ink having soluble particles where the particle in the printed 3D part may be removed post processing of the printed 3D part thereby imparting an intra-filament (e.g., intra-strand, intra ligament, etc.) porosity in the part. Intra-filament pores are defined as pores inside the associated filament. Each filament of a structure has intra-filament space comprised of material and pores, e.g., intra-filament pores. Inter-filament pores are defined as pores between two adjacent filaments. A structure is comprised of a plurality of filaments and the space between adjacent filaments is the inter-filament space, e.g., inter-filament pores.

In one embodiment, a silicone-based ink for additive manufacturing includes a vinyl-terminated diphenyl siloxane macromer, a treated silica hydrophobic reinforcing filler, a rheology modifying additive, and a plurality of porogen particles. In various approaches, the porogen particles are soluble in an aqueous solution. In a preferred approach, the porogen particles are soluble in water at a temperature in a range of about 40° C. to about 90° C., and preferably at about 80° C.

In preferred approaches, the porogen particles have an average diameter in a range of 1 microns (μm) to about 50 μm. An average diameter of a porogen particle is defined as the average of the maximum dimension of each particle. An average diameter of a plurality of porogen particles is defined as the average of a plurality of average diameters of porogen particles. In one approach, the average diameter of the porogen particles is in a range of about 10 μm to 30 μm.

In various approaches, the porogen particles may be a particle that may be removed from the printed structure following formation of the printed structure. In one approach, the porogen particles may be removed by soaking the printed part in a solution that dissolves the porogen particles. In one approach, the porogen particles may be removed by a heat treatment of the printed part that removes the porogen particles from the printed part while leaving the printed part intact.

In various approaches, the porogen particles are materials that may be incorporated on the siloxane ink to serve as a porogen. Any material that does not inhibit the crosslinking process of the siloxane formulation and can be removed or leached out of the siloxane structure has the potential to be usable as a porogen. In one approach, urea particles may be included in the siloxane ink as porogen particles. In one approach, sugar particles may be included in the siloxane ink as porogen particles. In another approach, polyethylene glycol particles, a mixture of urea particles with glycerol, etc. may be included in the siloxane ink as porogen particles.

In one embodiment, a product may include an ink as described and instructions for using the ink with an extrusion nozzle. In one approach, the instructions may be available online from a remote location. In one approach, the instructions may be in a container with the ink. In one approach, the instructions may be obtained on a container holding the ink. In preferred approaches, the average diameter of the porogen particles is relative to the diameter of the extrusion nozzle. In preferred approaches, the mean size distribution of the porogen particles in terms of average diameter of the porogen partiles may have a ratio to the diameter of the extrusion nozzle to be about 1:10. In some approaches, inks including porogen particles where the ratio of the average diameter of the largest of the porogen particles to the diameter of the extrusion nozzle may be as high as 1:3. However, in exemplary approaches, the majority of the porogen particles (e.g., at least 50% of the porogen particles) have an average diameter below a ratio of 1:10 of the diameter of the extrusion nozzle.

In one approach, a range of ratios of an average diameter of the porogen particles to a diameter of the extrusion nozzle may be about 1:5 to about 1:20. In an exemplary approach, the ratio of the diameter of the porogen particles to the diameter of the extrusion nozzle is about 1:10.

For example, and not meant to be limiting in any way, in one preferred approach a siloxane ink extruded from a 250 μm nozzle for printing a 3D part may include porogen particles having an average diameter of about 20 to 25 μm.

In some approaches, a spherical porogen particle may be desirable for a final application of the ink and product. In one approach using solid porogen material, highly spherical porogen particles may lower the stiffness of the resin at high porogen loading. In some approaches, an average circularity of the porogen particles may be greater than 0.90. In preferred approaches, an average circularity of the porogen particles may be greater than 0.95.

In another approach, using a mixture of solid porogen particles with a liquid coating material, for example, a mixture of urea particles with glycerol, the porogen particles with lower sphericity (e.g., non-spherical particles) might generate a highly porogen loaded printable ink.

By varying the amount of porogen on the siloxane formulation, additively manufactured structures using the direct ink write technique (DIW) with open or closed cell arrangements may be achieved. In some approaches, a concentration of porogen particles may be in a range of greater than 0 volume % (vol %) to about 75 vol % of volume of total ink, but may be higher. In one approach, a lower vol % (e.g., greater than 0 vol % to about 30 vol %) may generate a closed cell arrangement of pores in the printed 3D structure. In one approach, a higher volume % (e.g., greater than 50 vol % to about 75 vol %, but could be higher) may generate an open cell arrangement of pores in the 3D printed part. In an exemplary approach, a concentration of porogen particles in the ink may be about 50 vol % of the volume of total ink.

In an exemplary approach, the porogen particle is a urea particle. In one approach, a plurality of urea particles may be formed for the ink by using a capillary rheometer such that urea droplets are melt extruded to form spherical particles. In one approach, an average diameter of the urea particles may be in a range of about 10 μm to about 30 μm. In an exemplary approach, an average diameter of the urea particles is about 11 μm.

In one embodiment, a printed 3D structure having intrafilament porosity may be formed by leaching the soluble particles following printing and processing of the 3D structure formed with siloxane ink having soluble particles therein. In one approach, a process of applying heated water to the printed 3D structure of siloxane ink having urea particles may remove substantially all urea particles from the printed strands of the 3D structure. In other words, following application of heated water, the 3D printed siloxane structure includes substantially no urea particles, and a pore, void, etc. is in the location of the previously situated urea particle.

FIGS. 9A-9B depict a structure 900 of a 3D printed siloxane structure, in accordance with one embodiment. As an option, the present structure 900 may be implemented in conjunction with features from any other embodiment listed herein, such as those described with reference to the other FIGS. Of course, however, such structure 200 and others presented herein may be used in various applications and/or in permutations which may or may not be specifically described in the illustrative embodiments listed herein. Further, the structure 900 presented herein may be used in any desired environment.

FIGS. 9A and 9B scanning electron microscopy (SEM) images of a 3D printed siloxane structure, according to one embodiment, and are by way of example only and not meant to be limiting in any way.

In one embodiment, the structure 900 is a product of additive manufacturing with a silicone-based ink. The structure 900 includes a plurality of continuous filaments 906a, 906b. The continuous filaments 906a, 906b are comprised of a siloxane matrix 908. In one approach, the siloxane matrix may include vinyl terminated siloxane polymers.

In some approaches, the continuous filaments may be arranged in a geometric pattern. As shown in the structure 900, the continuous filaments 906a, 906b are arranged in a log-pile formation where a first layer of continuous filaments 906a are parallel to each other, and the second layer of continuous filaments 906b is positioned directly above the first layer, where the continuous filaments 906b of the second layer positioned largely perpendicular to the continuous filaments 906a of the first layer. In top down view of the structure 900 in FIG. 9B, the structure 900 has a geometric pattern 910 of the continuous filaments 906a, 906b.

In some approaches, the geometric pattern may be determined by the additive manufacturing technique.

In one approach, the 3D printed siloxane structure may have a plurality of inter-filament pores, where the inter-filament pores may be defined by the geometric pattern of the continuous filaments. As shown for structure 900, the geometric pattern 910 of the continuous filaments 906a, 906b forms a plurality of inter-filament pores 902. The inter-filament pores 902 may be defined by the geometric pattern 910. In some approaches, the inter-filament pores 902 may be tuned for a desired application.

In some approaches, as shown in part (a) of FIG. 9A, the diameter $d_{er}$ of the inter-filament pores 902 may be greater than 100 μm. In one approach, the diameter $d_{er}$ of the inter-filament pores 902 may be similar to the diameter $d_{f1}$, $d_{f2}$ of the continuous filaments 906a, 906b. The diameter $d_{f1}$, $d_{f2}$ of the continuous filament 906a, 906b may be measured across the width of the filaments 906a, 906b extruded from the nozzle. In one approach, the diameter $d_{er}$ of the inter-filament pores 902 may be less than the diameter $d_{f1}$, $d_{f2}$ of the continuous filaments 906a, 906b. In one approach, the diameter $d_{er}$ of the inter-filament pores 902 may be greater than the diameter $d_{f1}$, $d_{f2}$ of the continuous filaments 906a, 906b.

In one approach, the continuous filaments of the 3D structure may have an average diameter greater than about 100 μm. As shown in part (a) of FIG. 9A, for example in one approach, the average diameter $d_{f2}$ of the continuous filament 906b may be about 150 μm, and the average diameter $d_{f1}$ of the continuous filament 906a may be about 150 μm. As shown at a slightly lower magnification in FIG. 9B, the average diameter $d_{f2}$ of the continuous filament 906b may be about 150 μm, and the average diameter $d_{f1}$ of the continuous filament 906a may be about 150 μm.

In some approaches, the 3D printed siloxane structure may have a plurality of intra-filament pores. Part (b) of FIG. 9A is an expanded drawing of the cross-wise section of the continuous filament 906b as shown in part (a). As shown in part (b), the continuous filament 906b has a plurality of intra-filament pores 904 of various sizes. The intra-filament pores 904 are inside the continuous filaments 906a, 906b.

In some approaches, the intra-filament pores 904 may have an average diameter $d_{ra}$ in a range of greater than 1 μm to less than 50 μm. An average diameter $d_{ra}$ refers to an average of all diameters of the intra-filament pores where each diameter is measured as the greatest distance between two opposite ends of a pore, as shown for example in part (b).

In various approaches, the size and shape of the porogen particles may generate inter-connectivity between the pores of the 3D printed part. In one approach, spherical porogen particles may generate closed pores within the 3d printed part. In one approach, elongated porogen particles may generate an open inter-connected network of pores within the 3D printed part.

In various approaches, all continuous filaments formed by the siloxane ink during additive manufacturing techniques to form the 3D printed siloxane structure include a plurality of intra-filament pores.

In some approaches, the structure 900 has having inter-filament pores 902 interconnected from a surface of the 3D silicone-based structure to a surface on an opposite side of the 3D silicone-based structure.

In one approach, the intra-filament pores 904 may be interconnected from a surface of the associated filament 906a (as shown in part (a) of FIG. 9A) to a surface on an opposite side of the associated filament 906a. In other approaches, the intra-filament pores may not be interconnected. In various approaches, the interconnectedness of the intra-filament pores may depend on the concentration of porogen particles in the siloxane ink.

In some embodiments, the direct application of additive manufacturing using silicone-based inks with tunable stiffness may allow engineering of components and parts with specific properties including both low and high potential stiffness. In some approaches, silicone-based materials with differential stiffness may be 3D printed in tandem or simultaneously to generate unique objects with novel properties that are applicable to a wide-range of fields such as soft robotics and stretchable electronics.

FIG. 10 shows a method 1000 for forming a 3D printed siloxane structure having intra-filament porosity, in accordance with one embodiment. As an option, the present method 1000 may be implemented to construct structures such as those shown in the other FIGS. described herein. Of course, however, this method 1000 and others presented herein may be used to form structures for a wide variety of devices and/or purposes which may or may not be related to the illustrative embodiments listed herein. Further, the methods presented herein may be carried out in any desired environment. Moreover, greater or fewer operations than those shown in FIG. 10 may be included in method 1000, according to various embodiments. It should also be noted that any of the aforementioned features may be used in any of the embodiments described in accordance with the various methods.

The method 1000 begins with step 1002 of extruding a continuous filament of a mixture through a nozzle to form a structure having continuous filaments. The mixture, according to one approach, includes a vinyl-terminated siloxane macromer, a treated silica hydrophobic reinforcing filler, a rheology modifying additive, and a plurality of porogen particles.

In one approach, a range of a ratio of an average diameter of the porogen particles to a diameter of the nozzle is about 1:5 to about 1:20. Preferably, the ratio of average diameter of the porogen particles to a diameter of the nozzle is about 1:10. In some approaches, the average diameter of the porogen particles may be analyzed by volume distribution. In various approaches, the average diameter of porogen particles refers to an average of diameters measured from a plurality of porogen particles where each diameter is the largest distance between two opposite ends of a porogen particle. In some approaches, the diameter of the nozzle may be less than 500 μm, so as an example and not meant to be limiting in any way, a preferred average diameter of the porogen particles may be about 50 μm or less. In some approaches, the diameter of the nozzle may be about 250 μm, thus, a preferred average diameter of the porogen particles may be about 25 μm or less.

In some approaches, inks including porogen particles where the ratio of the average diameter of the largest of the porogen particles to the diameter of the extrusion nozzle may be as high as 1:3. However, in exemplary approaches, the majority of the porogen particles (e.g., at least 50% of the porogen particles) have an average diameter below a ratio of 1:10 of the diameter of the extrusion nozzle.

In addition to having control over the pore connectivity on the printed filaments, by tailoring the size and shape of the porogen particle, the pore network morphology may be tuned. In one approach, the porogen particles may be spherical in shape. In another approach, the porogen particles may be elongated in shape, thereby generating elongated pores within the 3D printed structure that may be interconnected.

In some approaches, the ink may be tuned for a low concentration of porogen particles. In other approaches, the ink may be tuned for a high concentration of porogen particles. In some approaches, a concentration of porogen particles in the ink may depend on the application of the ink in a direct ink writing process. In some approaches, a concentration of the ink may be in a range of greater than 0 vol % to about 75 vol % of volume of total ink, but may be higher. In one approach, a lower volume % (e.g., greater than 0 vol % to about 30 vol %) may generate a closed cell arrangement of pores in the printed 3D structure. In one approach, a higher vol % (e.g., greater than 50 vol % to about 75 vol %, but could be higher) may generate an open cell arrangement of pores in the 3D printed part. In an exemplary approach, the concentration of porogen particles in the ink may be about 50 vol % of volume of total ink, but may be higher or lower.

In various approaches, the porogen particles are materials that may be incorporated on the siloxane ink to serve as a porogen. Any material that does not inhibit the crosslinking process of the siloxane formulation and can be removed or leached out of the siloxane structure has the potential to be usable as a porogen. In one approach, urea particles may be included in the siloxane ink as porogen particles. In one approach, sugar particles may be included in the siloxane ink as porogen particles. In another approach, polyethylene glycol particles, a mixture of urea particles with glycerol, etc. may be included in the siloxane ink as porogen particles.

In one approach, the mixture may include a curing agent and a crosslinking agent. In one approach, the mixture may include an effective amount of an inhibitor for controlling a rate of curing by the curing agent.

Step 1004 of method 1000 includes curing the extruded mixture to at least a predefined extent to form the 3D printed siloxane structure.

Step 1006 of method 1000 includes leaching the porogen particles from the three dimensional printed siloxane structure. In some approaches, leaching the porogen particles includes soaking the three-dimensional printed siloxane structure in a solution to dissolve the porogen particles. For example, and not meant to be limiting in any way, in an exemplary approach, the porogen particles may be urea particles where the urea particles may be removed from the 3D printed siloxane structure by leaching the structure in water at an elevated temperature above room temperature, e.g., 80° C., for a duration of time, e.g., between 15 minutes to 30 minutes.

Experiments

Material and Methods

A poly(diphenylsiloxane-dimethylsiloxane) copolymer (10,000 cSt, ca. 5.5 mole % diphenylsiloxane), PLY3-7560, was obtained from NuSil Technology (Bakersfield, Calif.). Platinumdivinyltetramethyldisiloxane complex (Karstedt's catalyst, low color, ca. 2%) in xylene was supplied by Gelest, Inc (Morrisville, Pa.). (SIP6831.2LC), as were DMS-H11 (hydride terminated PDMS, 10 cSt), HMS-053 (trimethyl terminated [4-6% methylhydrosiloxane] dimethylsiloxane, 1000 cSt), DMS-V05 (divinyl PDMS, 8 cSt), and HMS-H271 (hydride terminated [30% methylhydrosiloxane] dimethylsiloxane copolymer, 60 cSt). 1-ethynyl-1-cyclohexanol (ETCH) was supplied by Sigma-Aldrich (St. Louis, Mo.). Bluesil™ Thixo Add 22646 was supplied by Elkem Silicones (Oslo, Norway). Aerosil® R812S and Sipernat® D13 were supplied by Evonik Industries (Essen, Germany), SIS 6962.1M30 was obtained from Gelest, and Cabosil EH5 was obtained from Cabot Corp (Boston, Mass.). All materials were used as-is without further purification. Formulations were prepared using a Flacktek DAC 150.1 FVZ-K SpeedMixer™ (Landrum, S.C.) for compounding. Catalyst cure temperatures and ink thermal response values were measured using a TA Instruments Discovery DSC (New Castle, Del.) differential scanning calorimeter using Tzero® aluminum sample pans (NDS Surgical Imaging, Sunnyvale, Calif.). Yield stress, viscosity, pot life measurements, and cure profiles were obtained with a TA Instruments AR2000EX rheometer equipped with a cross-hatched 25 mm Peltier parallel plate under a 1 mm sample gap spacing.

Once formulated, all silicone-based inks were filtered (pressurized air, 90 psi) through a Swagelok 140 µm mesh filter (Solon, Ohio) into 30 mL syringe barrels (Nordson EFD Optimum, East Providence, R.I.) and centrifuged (Nordson EFD ProcessMate 5000) to eliminate entrapped air. A flat-ended piston was inserted to seal the rear of the syringe; whereas, the syringe tip was equipped with a smooth-flow tapered nozzle (250 µm inner diameter) via luer-lock. The syringe was attached to a positive-displacement dispenser (Ultra 2800, Nordson EFD), which supplied the appropriate displacement to extrude ink through the nozzle. The syringe system was subsequently affixed to the z-axis of a custom Aerotech air-bearing gantry xy open frame movement stage, which was controlled via an A3200 controller through an Aerotech A3200 CNC operator interface (v5.05.000) (Aerotech Consumer Aerospace, Pittsburgh, Pa. 0. G-code instructions were programmed and run through the controller software to generate continuous FCT lattice structures with a 50% effective density. The lattice structures were printed onto silicon wafers with each layer of parallel filaments being printed orthogonal to the previous layer, yielding an FCT structural arrangement. The printed lattices were cured in a Yamato ADP300C vacuum drying oven (Yamato Scientific America, Inc, Santa Clara, Calif.).

Shore hardness values were obtained by preparing solid "pucks" of silicone material that were cured at 150° C. for 12-16 hours. Durometer values were measured at several different locations with a PTC Instruments Model 408 Type A Durometer (Los Angeles, Calif.). Printed lattice structures were sectioned with a razor blade and cross-sectional images were obtained with a Zeiss SteREO Discovery. V12 microscope (Zeiss, Dublin, Calif.) equipped with an Axiocam ICc 5 camera and analyzed with AxioVision software to measure the diameters of the printed filaments, individual layer heights, and total heights of the printed FCT lattices.

Example Preparation of MD-10A Silicone-Based Ink

A Flacktek Max 100 cup was charged with NuSil PLY3-7560 silicone polymer (24.6 g), platinum catalyst (4 ppm), and inhibitor (ETCH, 400 ppm); the components were mixed with a Flacktek DAC 150.1 FVZ-K SpeedMixer™ at 3500 rpm for 20 seconds. Aerosil® R812S fumed silica (4.2 g) was subsequently added to the mixture and mixed at 3500 rpm for 20 seconds; the sides of the cup were scraped, and the blend was speed-mixed again under the same conditions. Bluesil™ Thixo Additive 22646 (0.3 g) was added to the mixture, followed by speed-mixing at 3500 rpm for 20 seconds. Lastly, Gelest HMS-H271 (0.221 g) and Gelest DMS-H11 (0.644 g) were added and

TABLE 1

3D printable MD-XA silicone inks formulation details.

| Components | MD-10A | MD-25A | MD-45A | MD-55A | MD-60A | MD-70A |
|---|---|---|---|---|---|---|
| NuSil PLY3-7560 | 82% | 81.20% | 76.50% | 71.50% | 67% | 56% |
| Gelest DMS-V05 | — | — | 0.50% | 3.50% | 5% | 9.50% |
| Karstedt's Catalyst | 4 ppm | 4 ppm | 4 ppm | 4 ppm | 4 ppm | 4 ppm |
| ETCH[a] | 400 ppm | 400 ppm | 400 ppm | 400 ppm | 400 ppm | 400 ppm |
| Aerosil ® R812S | 14% | 18% | 12% | 12% | 12% | — |
| Sipernat ® D13 | — | — | 10% | 12% | 15% | 33.50% |
| Bluesil ™ Thixo Additive 22646 | 1% | 0.60% | 1% | 1% | 1% | 1% |
| Gelest DMS-H11 | 0.875 eq.[b] | — | — | — | — | — |
| Gelest HMS-H271 | 0.75 eq.[b] | 1 eq.[b] | 2 eq.[b] | 2 eq.[b] | 2 eq.[b] | 2 eq.[b] |
| Shore A Durometer | 10A | 25A | 45A | 55A | 60A | 70A |

[a]1-ethynyl-1-cyclohexanol.
[b]Equivalents are per each equivalent reactive vinyl goup within each formulation.

speed mixed into the blend at 3500 rpm for 20 seconds. The sides of the cup were scraped, and the dispersion blend was speed-mixed again under the same conditions, yielding a viscous translucent polysiloxane ink.

As shown in Table 1, a 3D printable silicone-based ink was prepared with a reduced silica filler loading (14 wt. % HMDZ-treated silica) and cured using 0.75 equivalents (hydride:vinyl) of a dihydride chain extender and 0.75 equivalents of silane crosslinker, which was sufficient to decrease the measured durometer to Shore 10A, (named "modified durometer 10A" or MD-10A).

Evidence of Pseudoplasticity

Analysis of shape retention behavior may be used to evaluate the relationship between properties of silicone-based ink materials. In brief, using a model of Hershel-Bulkley material moving through a cylindrical nozzle, an extruded core material having properties characteristic of an unyielded silicone-based ink based may be subjected to beam deflection analysis. Equation 1 shows the relationship of the elastic behavior of an ink to a desired beam deflection, in which γ represents the specific weight of an ink and s represents the beam length (L) to strand diameter (D) ratio, L/D.

$$G' \geq 1.4 \gamma s^4 D \quad \text{Equation 1}$$

According to Equation 1, the 3D printable silicone-based inks may possess G' values several orders of magnitude higher than that recommended for a strand deflection of ≤0.05 D. Thus, in some approaches, the deposition speed may be tuned to print lower G' inks for 3D printed architectures. Moreover, in come approaches, custom silicone-based ink formulations may support higher density fillers for 3D printed architectures.

FIG. 3A shows the oscillatory stress (Pa, x-axis) of storage modulus (G', y-axis) values for silicone-based inks containing various levels of rheological additive. Yield stress was defined as the oscillatory stress corresponding to 90% of the storage modulus plateau. Increasing the rheological additive content led to an increase in ink yield stress to 410 Pa for an ink containing 0.25 wt. % of a rheological additive (●), 515 Pa for 0.50 wt. % of a rheological additive (▲), and 540 Pa for 1.0 wt. % of a rheological additive (▼) as the degree of pseudoplasticity increased. In the absence of a rheological modifier (■), no pseudoplasticity was observed; instead, the measured storage modulus (G') was always less than that of the loss modulus (G"). However, when the rheological additive was added in the presence of treated silica filler, a highly pseudoplastic material with a large yield stress was obtained.

FIGS. 3B and 3C show a lattice 8-layer structure formed by 3D printing with a silicone-based ink with 1.0 wt. % rheological additive (FIG. 3B) and with silicone-based ink without rheological additive (G">G') (FIG. 3C). Mechanistically, without wishing to be bound by any theory, it is believed the pseudoplasticity was due to the formation of a stable three-dimensional network between silica filler particles and the rheological additive via hydrogen bonding and potential van der Waals interactions.

FIG. 3D is a plot of the effect of treated reinforcing silica filler (with a constant 1.0 wt. % rheological additive) on the observed yield stress of DIW inks. At a rheological additive concentration of 1.0 wt. %, loading of increasing concentrations of treated silica were studied to determine the appropriate quantity of silica necessary to print soft 3D materials. Oscillatory rheology was performed, demonstrating that at a relatively low loading of HMDZ-treated silica (10 wt. %, ■), the measured yield stress was 130 Pa, a value deemed too low for our 3D printing processes; yield stress values increased to 400 Pa, 545 Pa, and 690 Pa for silicone-based formulations comprising, 15 wt. % (□), 18 wt. % (▲), and 20 wt. % (*) HMDZ-treated silica, respectively. Thus, it was demonstrated that the rheology of the ink formulations may be tuned through an adjustment in silica loading.

Pt-Catalyzed Hydrosilylation Chemistry

A low color Karstedt Pt catalyst was selected as a platinum catalyst complex and 1-ethynyl-1-cyclohexanol (ETCH) was selected as the reaction inhibitor. To obtain inks with a long printable time windows, 300-400 ppm ETCH was added for 4-5 ppm Pt catalyst to sufficiently inhibit silicone curing while still providing rapid curing at elevated temperatures (ca. 125-150° C.).

Figure 4:
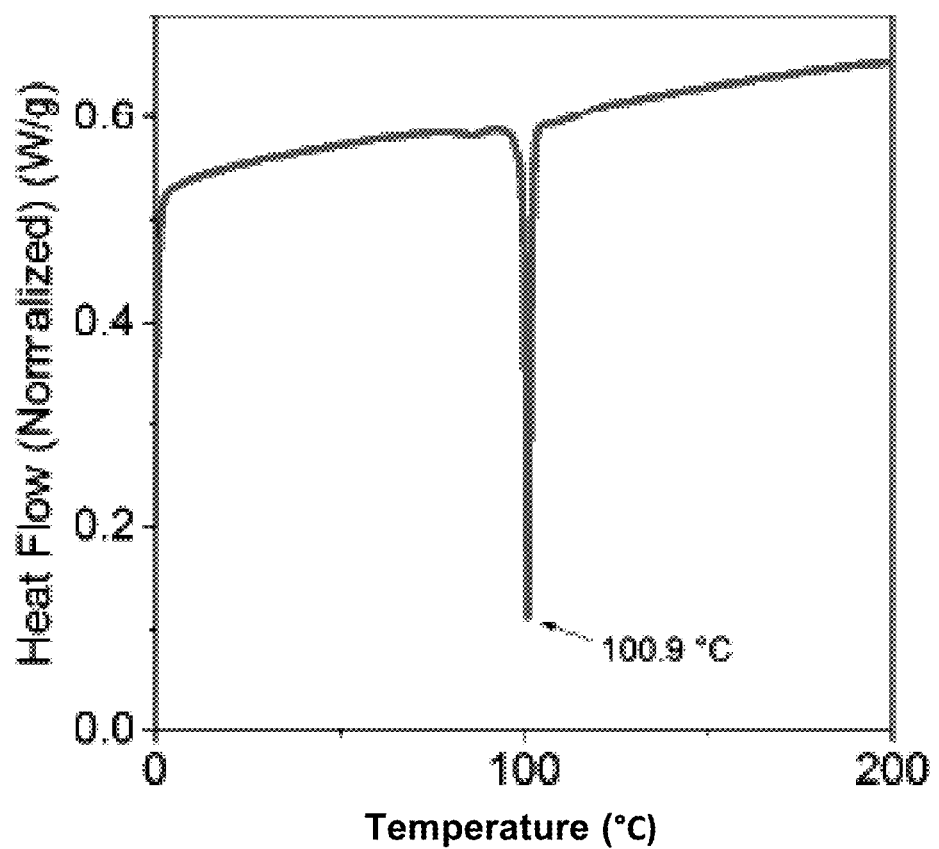
FIG. 4 is a plot of a normalized temperature sweep for a polysiloxane matrix, according to one embodiment.

FIG. 4 shows a normalized temperature sweep (x-axis) for a polysiloxane matrix containing 4 ppm Pt-Karstedt's catalyst and 500 ppm ETCH inhibitor in which the normalized heat flow of the polysiloxane matrix was measured (y-axis, W/g). As shown in FIG. 2, the onset of curing is indicated by the endothermic peak at 100.9° C.

Figure 5:
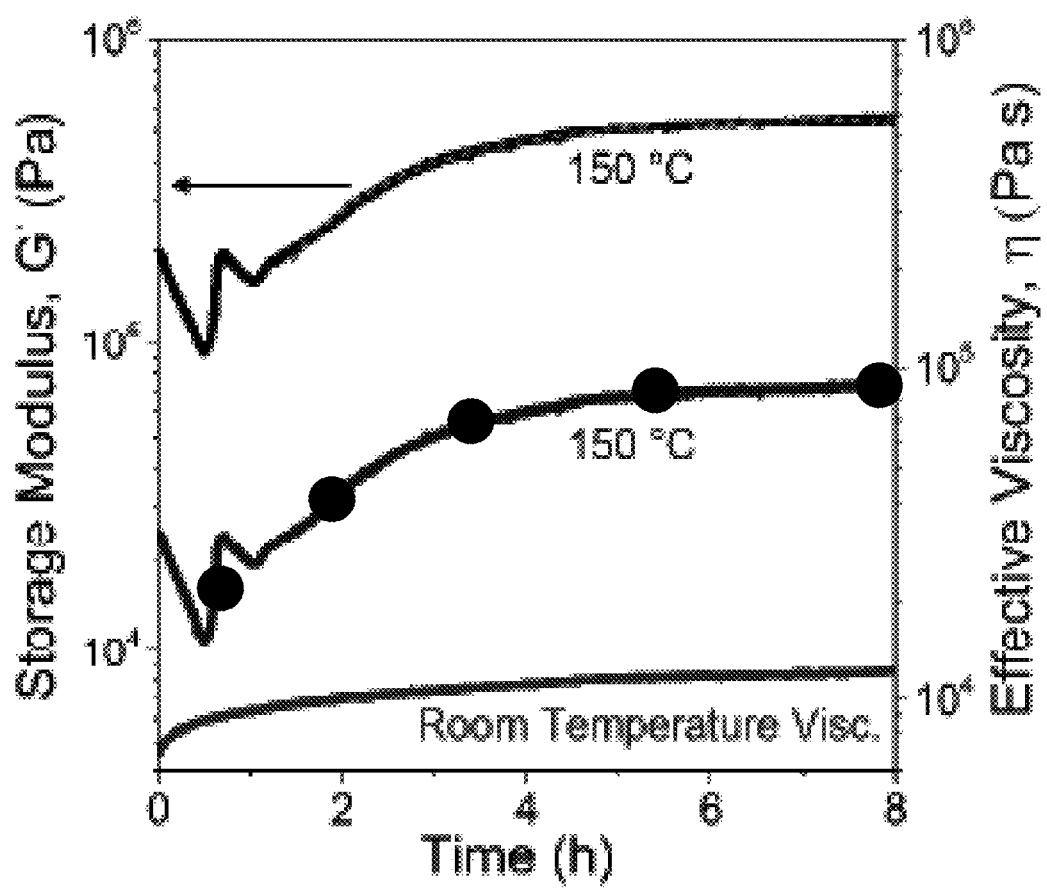
FIG. 5 is a plot of the oscillatory rheology of silicone-based inks at variable temperatures, according to one embodiment.

To analyze the working print time, a 3D printable silicone-based composite was prepared in the presence of 4 ppm Pt-Karstedt's catalyst, 400 ppm ETCH, and 1.0 equivalent of silane crosslinker. FIG. 5 shows the oscillatory rheology a 3D printable silicone-based composite at room temperature and at 150° C. over time, 0 to 8 hours (x-axis). From this analysis, the effective viscosity (right y-axis) of the silane-based composite remained stable with low viscosity and long pot life at room temperature for greater than 8 hours (bottom curve), whereas at 150° C., the effective viscosity curve (●) showed curing with a dramatic rise in viscosity could be initiated within the first hour of elevated temperature. Analysis of the storage modulus (left y-axis), showed a similar dramatic patterned curve at 150° C. (uppermost curve). Thus, this analysis showed printing with silicone-based inks as described may be stored over 24 hours after preparation; and storing inks in a cold environment may further prolong the pot life.

Figure 6A:
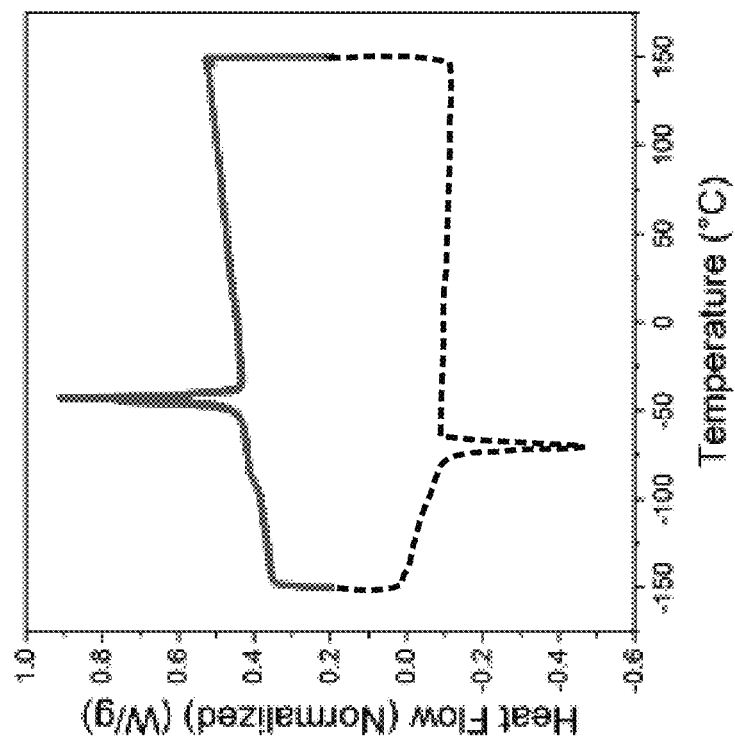
FIG. 6A is the DSC heating profile curves of silicone-based ink, according to one embodiment.
Figure 6B:
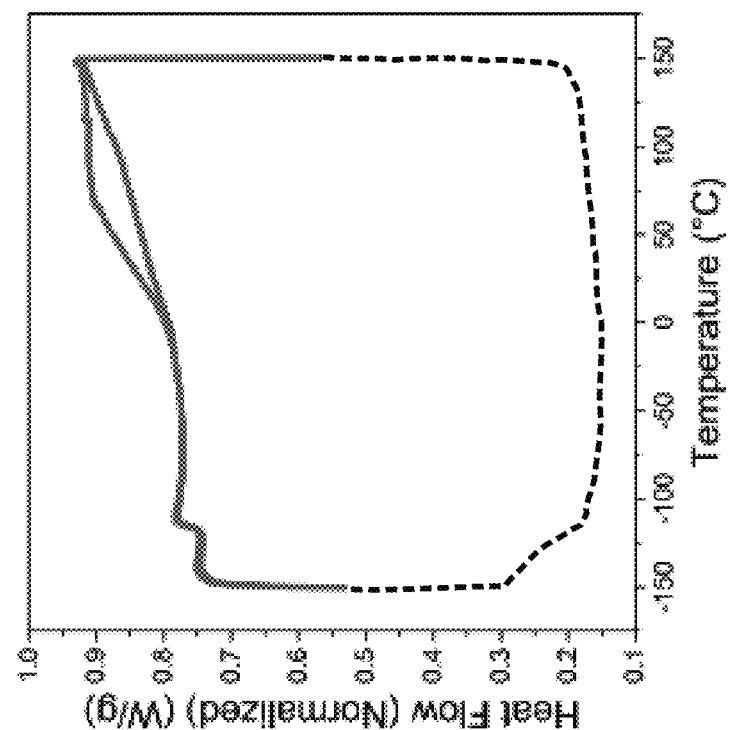
FIG. 6B is the DSC heating profile curves of standard PDMS material, according to one embodiment.

Silicone-Based Inks with Tunable Stiffness 3D printable silicone-based inks were prepared following Shore hardness durometer values 10A, 25A, 45A, 55A, 60A, and 70A, which were named MD-XXA, where XX corresponds to the Shore hardness. The complete formulation details for each material is shown on Table 1 (see above). FIGS. 6A and 6B show the DSC heating profiles for standard PDMS material (FIG. 6B) and polysiloxane ink MD-70A (FIG. 6A). The DSC heating profile involved a temperature ramp (solid curve) from −150° C. to 150° C. at a rate of 10° C. ° C./minute, followed by an isothermal hold for 1 minute and a cooling ramp (dashed curve) from 150 to −150° C. at a rate of 10° C./minute, followed by an isothermal hold for 1 min prior to a final temperature ramp (solid curve) from −150° C. to 150° C. at a rate of 10° C./minute.

FIG. 6B depicts the normalized DSC curve for a standard PDMS material, showing characteristic crystallization peak (dashed curve) and melting peak (solid curve). In contrast, FIG. 6A shows a normalized DSC curve for a characteristic variable stiffness polysiloxane ink (MD-70A) demonstrating the absence of crystallinity in the MD-70 material as a result of the use of the poly(dimethylsiloxane)-co-(diphenylsiloxane) macromer.

3D Printed Structures from Silicone-Based Ink

Figure 7B:
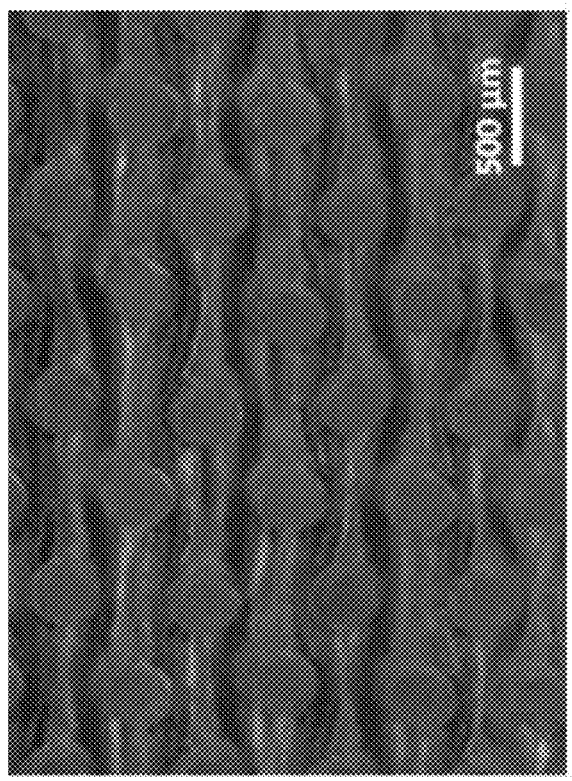
FIG. 7A-7B are cross-sectional images of lattice structures of silicone-based inks, according to various embodiments.
Figure 7A:
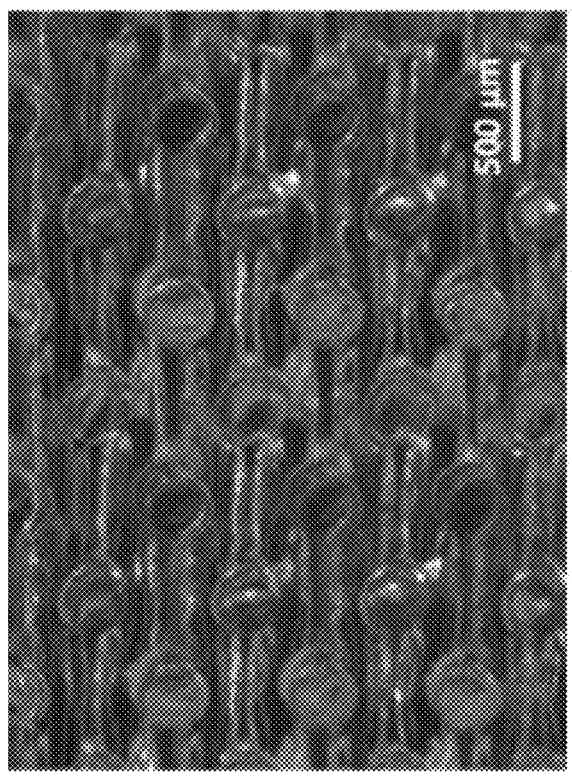

A representative cross-sectional image of lattice structures from 3D printing with silicone-based ink MD-10A is shown in FIG. 7A and with silicone-based ink MD-70A is shown in FIG. 7B. Each structure resulted in 28 printed layers with an FCT (face centered tetragonal) geometry, 1000 μm center-to-center spacing, and a 250 μm filament diameter.

Stiffness Tunability of Silicone-Based Ink for 3D Printing

Tensile and compression testing of silicone-based ink demonstrated stiffness tunability. FIGS. 8A-8D show the tensile and compression results for silicone-based inks MD-10A, MD-45A, and MD-70A. FIG. 8A shows a plot of tensile stress (y-axis) versus tensile strain (x-axis) of silicone-based inks MD-70D (■), MD-45A (●), and MD-10A (solid black line). The softest material, MD-10A, featured a Young's modulus of 0.40 MPa with an average elongation at break of 528%. MD-45A (●) featured a Young's modulus of 3.61 MPa with an average elongation at break 362%. The hardest material, MD-70A (■) featured a Young's modulus of 11.51 MPa with an average elongation at break of 77%.

The relative compressive performance of the silicone-based inks was measured by applying a cyclic compressive load of 2000 kPa to an 8 layer FCT lattice (500 μm center-to-center spacing, 250 μm filament diameter). FIG. 8B shows a summary of the compressive load deflection curves and peak compressive strain values of 59.2%, 56.6%, and 48.1% were measured after 3 successive load-unload cycles for MD-10A (solid line), MD-45A (●), and MD-70A (■), respectively. These results demonstrated hysteresis with regard to stable cyclic compressive loads.

A physical demonstration of the large difference in material properties at either end of the hardness spectrum is shown in FIGS. 8C and 8D. Observable variable stiffness of 3D printed silicone lattices evident through compression loading with 1200 g static weighted samples for MD-10A (FIG. 8C) and MD-70A (FIG. 8D).

FIG. 8E depicts the demonstration of the potential for soft robotic applications through the printing of a pneumatically-driven gripper comprised solely of MD-10A and MD-70A. An air-driven soft robotic actuator was 3D printed as a single component. Pressurization of the hollow interior channels comprising soft silicone (MD-10A) exhibiting high strength and low stiffness were able to expand and deflect the reinforcing frame of the actuator, which was printed with a stiff silicone material (MD-70A). Various forms of bio-inspired locomotion and bio-mimicry in the form of soft robotics applications could thus be engineered in a similar fashion.

Preparation of Porogen Particles

In the following experiments, urea particles were prepared to be used as porogen particles. Urea particles (Sigma Aldrich Corp., St. Louis, Mo.) were melted and extruded using a capillary rheometer (Malvern Panalytical, Malvern, UK, RH10, Advanced Capillary Rheometer) using a left bore (0.25 mm diameter die with a length of 4 mm and flat entrance) and a right bore (0.25 mm diameter die with a length of 0.25 mm and flat entrance). Bore temperature for melting and extruding the urea was 140° C. Urea particles were collected in a 1 cSt silicone oil solution to cool the urea melt droplets, forming discrete solid spherical particles upon contact in the oil. Increasing the extrusion speed resulted in the generation of smaller particles.

Characterization of Extruded Urea Particles

Using a Morphologi G3 system (Malvern Panalytical, Malvern, UK), average values of diameter and circularity for urea particles were determined from extrusion at variable shear rates as listed in Table 2. Increased extrusion rates resulted in urea particles with a smaller mean diameter.

Batches of urea particles were sieved to remove undesired particle size for ink. A Gilson ROTAP Sieve Shaker (RX-29, Gilson Company, Inc., St. Louis, Ohio) with a top sieve (63 μm) and bottom sieve (45 μm) was used to obtain urea particles of desired size.

FIG. 11 depicts the characterization of urea particles after sieving. Part (a) is a plot of the number distribution of urea particles according to a mean CE diameter. The mean CE diameter of the majority of sieved urea particles is 13.26 μm. Part (b) is a plot of the volume distribution (D[4,3]) of sieved urea particles according to mean CE diameter. The mean CE diameter (D[4,3]) of the majority of sieved urea particles is 50.41 μm. Part (c) is a plot of the circularity of the sieved urea particles. Nearly the sieved urea particles have a circularity mean of 0.903, with a majority of the particles having a circularity greater than 0.95.

3D Printing with Siloxane Ink Including Urea Particles

The amount of urea particles mixed with the siloxane formulation, as described herein, determined a desired porosity of the final printed structure. In one experiment, 54.5 wt % of urea particles to total siloxane ink was used to form a 3D printed siloxane structure.

FIG. 12 illustrates a yield stress plot of siloxane resin with and without urea particles. The storage modulus, G', of the inks as measured on the left y-axis shows the siloxane resin with urea particles (■) has a similar curve as the siloxane resin without urea particles (□). The loss modulus, G", of the inks as measured on the right y-axis shows the siloxane resin with urea particles (●) has a similar curve pattern as the siloxane resin without urea particles (○). The cross-over point between G' and G" of the siloxane resin with urea particles is about 520 Pa, and the cross-over point of the siloxane resin without urea particles is about 174 Pa.

A 3D printed structure was formed as a face centered tetragonal (FCT) structure having seven layers and a porosity of 20 vol % using a 250 µm nozzle to extrude the siloxane ink having urea particles onto a substrate. The 3D printed structure had a 375

TABLE 2

Characterization of Urea Particles at different Extrusion Shear Rates

| Sample No. | Extrusion Rate (mm/min) | CE Diameter Mean (µm) | CE Diameter D[4,3] Mean (µm) | Circularity Mean | No. Particles Counted |
|---|---|---|---|---|---|
| 1 | 600 | 21.86 | 330.10 | 0.960 | 164876 |
| 2 | 800 | 17.64 | 155.90 | 0.948 | 506519 |
| 3 | 1000 | 17.07 | 107.00 | 0.934 | 324834 |
| 4 | 1100 | 16.65 | 95.93 | 0.942 | 555545 |
| 5 | 1200 | 11.64 | 92.99 | 0.940 | 481018 |

µm road width and a 225 µm layer height. The 3D printed siloxane structure was cured using a temperature ramp from 0° C. to 100° C., and a cure at 100° C. for 12 hours.

FIGS. 13A and 13B show SEM images of a cured 3D printed structure of siloxane with spherical urea particles. FIG. 13A is an image of a cross section of the 3D printed structure showing the inside of the filaments where the siloxane material has a plurality of urea particles. FIG. 13B is an image of a top down view of the 3D printed structure showing uniform filaments of the siloxane material with urea particles on the surface of the filaments.

The urea particles were removed from the 3D printed siloxane structure by exposing the printed structure to water. The structures were placed in heated deionized (DI) water at 80° C. for about three hours. As shown in Table 3, removal analysis determined that all the urea particles were leached from the FCT 7-layered, 54.5 wt % urea-loaded structure by 3 hours of water exposure as measured by weight loss.

TABLE 3

Analysis of Urea Removed from 3D Printed Structure During Water Exposure

| Sample | Exposure Time to water (hh:mm:ss) | Urea present post-cure (g) | Weight Loss during leaching (g) | Wt % of urea present after leaching |
|---|---|---|---|---|
| 1 | 0:15:00 | 0.247 | 0.144 | 41.80 |
| 2 | 0:30:00 | 0.292 | 0.192 | 34.31 |
| 3 | 0:45:00 | 0.286 | 0.194 | 32.29 |
| 4 | 1:00:00 | 0.267 | 0.236 | 11.76 |
| 5 | 1:30:00 | 0.251 | 0.247 | 1.30 |
| 6 | 2:00:00 | 0.258 | 0.254 | 1.87 |
| 7 | 3:00:00 | 0.281 | 0.285 | −1.18 |
| 8 | 4:00:00 | 0.266 | 0.273 | −2.69 |
| 9 | 6:00:00 | 0.261 | 0.269 | −3.33 |
| 10 | 8:00:00 | 0.292 | 0.303 | −3.42 |
| 11 | 8:00:00 | 0.258 | 0.266 | −3.10 |

Following the leaching of the urea particles, the 3D printed siloxane structures were post-cured at 150° C. for 10 hours to allow the material to fully cross-link and dry the 3D printed structure. The images of the 3D printed porous siloxane structure in FIGS. 9A and 9B depict the structure following leaching of the urea particles and drying.

Measurements of the filaments of the 3D printed structures before and after leaching were performed using ImageJ computer software (open platform) by comparing measurements from the SEM images of FIGS. 13A and 13B and FIGS. 9A and 9B, respectively. The analysis demonstrated that in one example, and not meant to be limiting in any way, a filament diameter of the structure before leaching (after pre-cure) had a mean measurement 232.56±9.03 µm and a filament diameter of the structure after leaching (and post-cure) had a mean measurement of 182.42±9.34 µm, thereby resulting in an estimated 21.56% shrinkage of the filament following leaching.

Different Volumetric Loading of Porogen Particles in Ink for 3D Printing

The scanning electron microscope (SEM) images shown in FIG. 14 represent printed siloxane structures generated with inks having different volume loadings of the porogen material. By using a low volume loading of the porogen particles, such as the 25 vol % presented in image in part (a), a closed cell network can be created inside the printed filaments. By having a high porogen loading on the formulated ink, pores start to connect inside the printed filaments forming open cell networks, such as the 70 vol % presented in image in part (b).

Porogen Morphology in the 3D Printed Part

FIG. 15 shows SEM images of 3D printed filaments using urea particles as the porogen material in a siloxane ink. Part (a) is an image of a structure having pores formed with urea particles having a spherical shape. Part (b) is an image of a structure having pores formed with urea particles having a smaller, elongated shape.

Porogen Particles in 3D Siloxane Inks

The SEM images of FIG. 16 depict a siloxane 3D printed structure formed by DIW with a siloxane ink having sugar particles used as porogen particles. Part (a) represents an image the geometric shape of the 3D printed structure having pores shaped from sugar particles. Part (b) is an image of a magnified view of a filament of the 3D printed structure in the image of part (a). Part (c) is an image of a magnified view of a pore of the filament from the image of part (b). Part (d) is an image of a magnified view of the inside of the pore from the image of part (c).

SEM images of FIG. 17 depict a siloxane 3D printed structure formed by DIW with a siloxane ink having polyethylene glycol (PEG) particles used as porogen particles. Part (a) represents an image the geometric shape of the 3D printed structure having pores shaped from PEG particles. Part (b) is an image of a magnified view of a filament of the 3D printed structure of part (a). Part (c) is an image of a magnified view of a portion of filament having pores from part (b). Part (d) is an image of a magnified view of the portion from part (c).

SEM images of FIG. 18 depict a siloxane 3D printed structure formed by DIW with a siloxane ink having a mixture of urea particles and glycerol used as porogen particles. Parts (a), (b), and (c) are images of the printed structure before removing the porogen particles. Parts (d), (e), and (1), are images of the printed structure after removing the porogen.

In Use

Functional 3D printed soft materials have a diverse range of applications and potential within the fields of materials engineering, bioengineering, and electronics. Through precise control over the deposition of highly-engineered viscoelastic inks in the form of continuous filaments, complex 3D architectures may be additively fabricated, layer-by-layer, to generate parts that are directly applicable to cutting-edge technologies, including aerospace and defense, microwave optics, supercapacitors, piezoelectrics, and mechanical metamaterials. In particular, 3D printed silicones may be well suited to soft materials applications including high-performance foams and cellular-solids, soft robots, biomedical devices and biological scaffolds, and flexible and stretchable electronics. It would be desirable to tune silicone-based printable material to form 3D printed silicone structures variable stiffness.

Some embodiments as described herein may be used as an alternative for printing 3D structures with open and closed pore networks. In some approaches, the 3D printed siloxane structures may be useful for 3D printed clothing.

Various embodiments described herein may be applied to 3D engineered cellular solids, foam structures, shock-absorbing cushions, soft robotics, biomedical devices (biocompatibility), prosthetics, metamaterials, flexible electronics, and optic systems. Additionally, the low temperature performance, up to negative 100° C., may be suitable to applications in extreme conditions such as space.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A silicone-based ink for additive manufacturing, the ink comprising:
   a vinyl-terminated diphenyl siloxane macromer;
   a treated silica hydrophobic reinforcing filler;
   a rheology modifying additive; and
   a plurality of porogen particles.

2. The ink as recited in claim 1, wherein the porogen particles are soluble in an aqueous solution.

3. The ink as recited in claim 1, wherein an average diameter of the porogen particles is in a range greater than one micron to about 50 microns.

4. The ink as recited in claim 1, wherein an average diameter of the porogen particles is in a range of greater than 10 microns to about 30 microns.

5. A product, comprising: the ink as recited in claim 1, and instructions for using the ink with an extrusion nozzle whereby a range of a ratio of an average diameter of the porogen particles to a diameter of the extrusion nozzle is about 1:5 to about 1:20.

6. The ink as recited in claim 1, wherein an average circularity of the porogen particles is greater than 0.90.

7. The ink as recited in claim 1, wherein a concentration of the porogen particles is in a range of greater than 0 volume % to about 75 volume % of volume of total ink.

8. The ink as recited in claim 1, wherein the porogen particles are selected from the group consisting of: urea particles, sugar particles, polyethylene glycol, and a mixture of urea particles and glycerol.

9. A product of additive manufacturing with the silicone-based ink as recited in claim 1, the product comprising:
   a plurality of continuous filaments arranged in a geometric pattern, wherein each of the continuous filaments comprises a siloxane matrix having a plurality of intra-filament pores; and
   a plurality of inter-filament pores, wherein the inter-filament pores are defined by the geometric pattern of the continuous filaments,
   wherein the intra-filament pores have an average diameter in a range of greater than 1 micron to less than 50 microns.

10. The product as recited in claim 9, wherein the intra-filament pores are interconnected from a surface of the associated filament to a surface on an opposite side of the associated filament.

11. A method of forming a three-dimensional printed siloxane structure having intra-filament porosity using the silicone-based ink of claim 1, the method comprising:
   extruding a continuous filament of the silicone-based ink through a nozzle to form a structure having continuous filaments;
   curing the extruded ink to at least a predefined extent to form the three-dimensional printed siloxane structure; and
   leaching the porogen particles from the three-dimensional printed siloxane structure.

12. The method as recited in claim 11, wherein the silicone-based ink includes a curing agent, a crosslinking agent, and an effective amount of an inhibitor or controlling the rate of curing by the curing agent.

* * * * *